(12) United States Patent
Kohli et al.

(10) Patent No.: US 7,213,068 B1
(45) Date of Patent: May 1, 2007

(54) POLICY MANAGEMENT SYSTEM

(75) Inventors: Madhur Kohli, Morristown, NJ (US); Jorge Lobo, New York, NY (US); Shamin A. Naqvi, Morristown, NJ (US); Aashu Virmani, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1264 days.

(21) Appl. No.: 09/710,551

(22) Filed: Nov. 9, 2000

Related U.S. Application Data

(60) Provisional application No. 60/165,374, filed on Nov. 12, 1999.

(51) Int. Cl.
*G06F 15/173* (2006.01)
*G06F 11/00* (2006.01)

(52) U.S. Cl. ............... 709/225; 709/223; 709/224
(58) Field of Classification Search ........ 709/220–225; 714/4, 37, 47
See application file for complete search history.

(56) References Cited

U.S. PATENT DOCUMENTS

| | | | | |
|---|---|---|---|---|
| 5,557,747 A * | 9/1996 | Rogers et al. | ............... | 709/223 |
| 5,758,083 A * | 5/1998 | Singh et al. | ................ | 709/223 |
| 5,777,549 A * | 7/1998 | Arrowsmith et al. | ........ | 340/506 |
| 5,872,928 A * | 2/1999 | Lewis et al. | ................ | 709/222 |
| 5,889,953 A * | 3/1999 | Thebaut et al. | ............. | 709/221 |
| 6,141,686 A * | 10/2000 | Jackowski et al. | .......... | 709/224 |
| 6,167,445 A * | 12/2000 | Gai et al. | .................... | 709/223 |
| 6,234,747 B1 * | 5/2001 | Mielke et al. | .............. | 415/119 |
| 6,272,537 B1 * | 8/2001 | Kekic et al. | ................. | 709/223 |
| 6,275,844 B1 * | 8/2001 | Rail | ........................... | 718/102 |
| 6,336,139 B1 * | 1/2002 | Feridun et al. | ............. | 709/224 |
| 6,381,639 B1 * | 4/2002 | Thebaut et al. | ............. | 709/222 |
| 6,393,485 B1 * | 5/2002 | Chao et al. | ................. | 709/231 |
| 6,502,131 B1 * | 12/2002 | Vaid et al. | ................... | 709/224 |
| 6,505,244 B1 * | 1/2003 | Natarajan et al. | ........... | 709/223 |
| 6,539,425 B1 * | 3/2003 | Stevens et al. | ............. | 709/220 |
| 6,539,427 B1 * | 3/2003 | Natarajan et al. | ........... | 709/224 |
| 6,553,401 B1 * | 4/2003 | Carter et al. | ................ | 709/200 |
| 6,584,502 B1 * | 6/2003 | Natarajan et al. | ........... | 709/224 |
| 6,601,082 B1 * | 7/2003 | Durham et al. | ............. | 718/100 |
| 6,678,827 B1 * | 1/2004 | Rothermel et al. | ......... | 713/201 |
| 6,678,835 B1 * | 1/2004 | Shah et al. | .................... | 714/4 |
| 6,765,864 B1 * | 7/2004 | Natarajan et al. | ........... | 370/224 |

\* cited by examiner

*Primary Examiner*—Krisna Lim
*Assistant Examiner*—Yasin Barqadle

(57) ABSTRACT

A policy management system implements a programmable policy-based approach for managing network elements in a telecommunication network. The policy management system includes one or more policy proxies associated with the network elements and a central policy processing point in communication with the policy proxies. The policy proxies are configured to notify the policy processing point of events occurring in the network. The policy processing point is run-time programmable with one or more policies to process such events and to notify one or more of the policy proxies of actions to be taken in response thereto. The policy proxies implement these actions at the network elements they represent.

27 Claims, 13 Drawing Sheets

FIG. 3

```
public interface ServiceInterface {
/** This method is called by the hosting ServiceNode (which itself has the arg) upon initializing */
void setServiceNode (ServiceNode aServiceNode);
/** Called when a session is opened with this ServiceInterface */
void onOpen (Session aSession);
/** Called when a sendRequest is made to this ServiceInterface */
String onRequest (Session aSession, String aRequest);
/** Called when a sendMessage is made to this ServiceInterface */
void onMessage (Session aSession, String aMessage);
/** Called when a close is made to this ServiceInterface */
void onClose (Session aSession);
/** Called when a Server Session closes abnormally */
void onAbnormalClose (Session aSession);
}
```

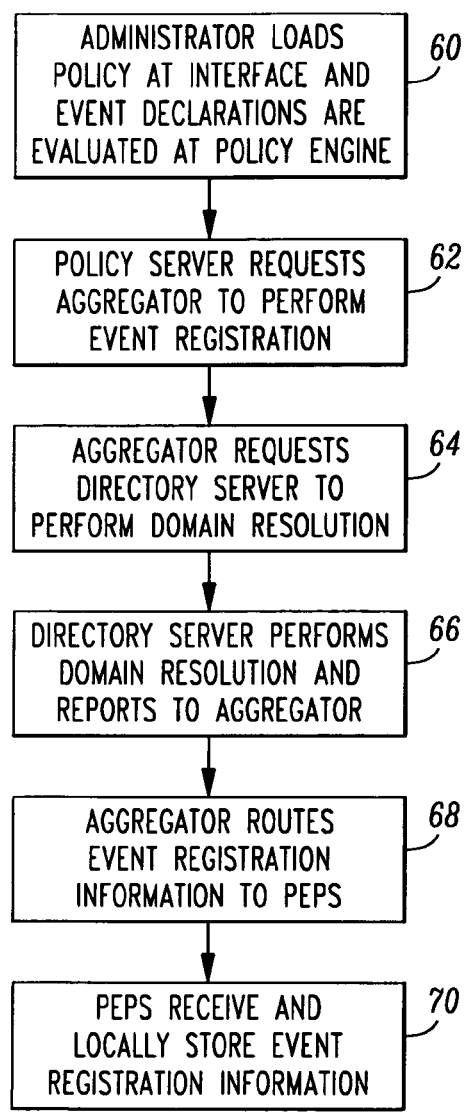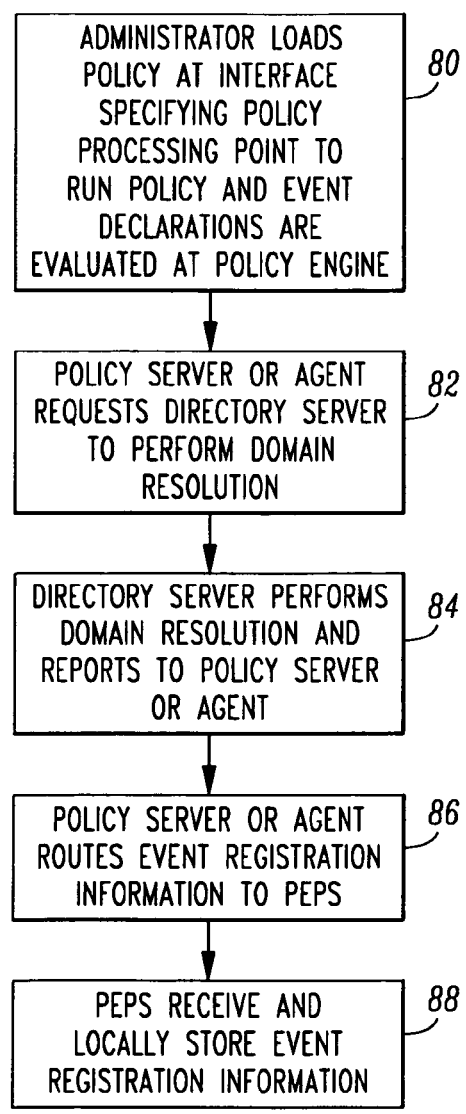

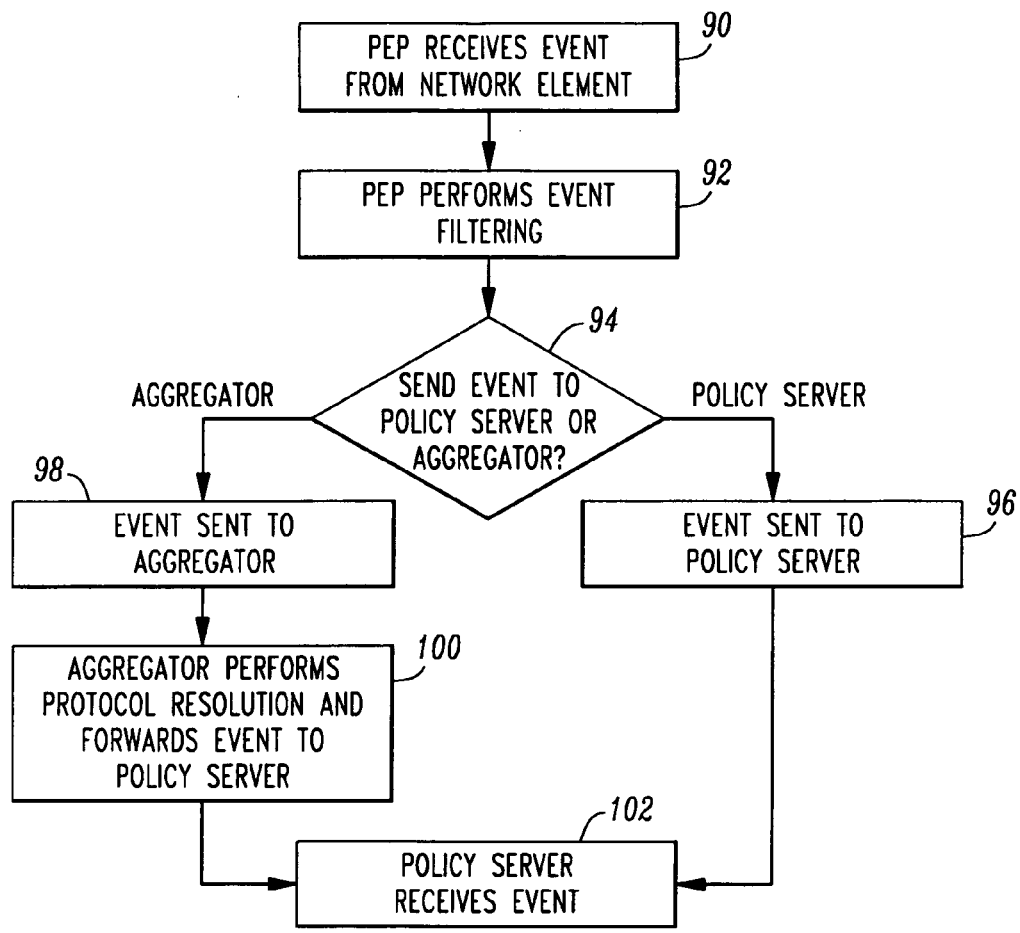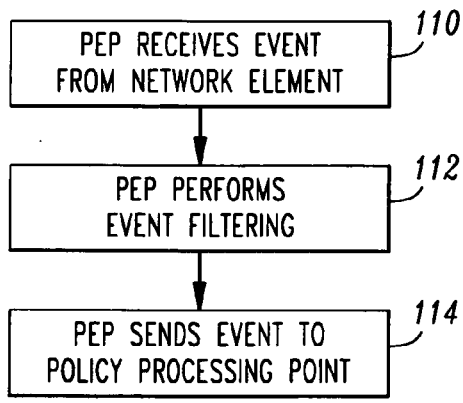

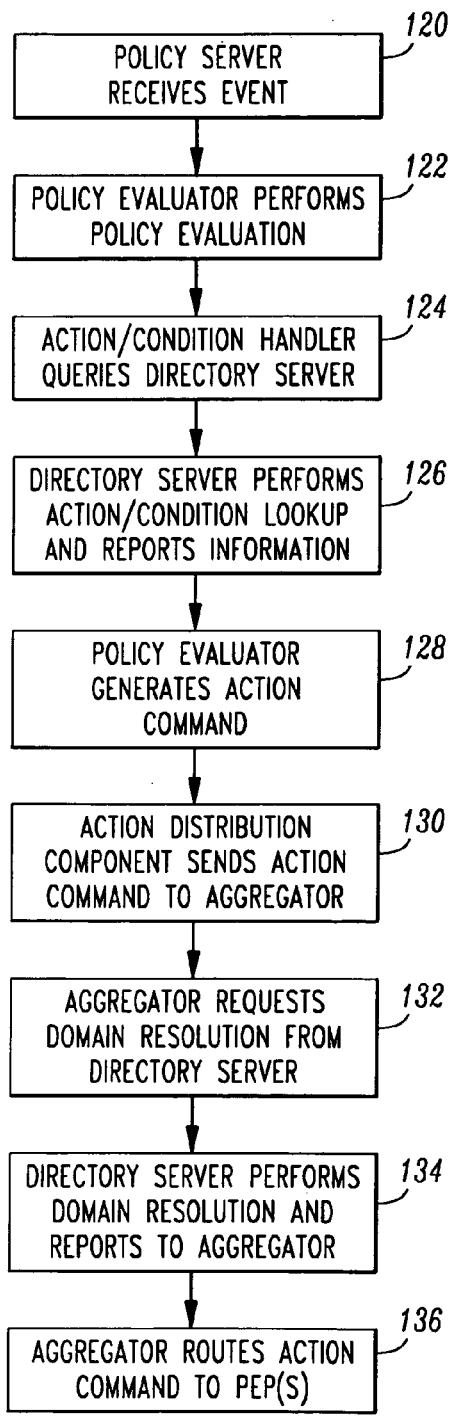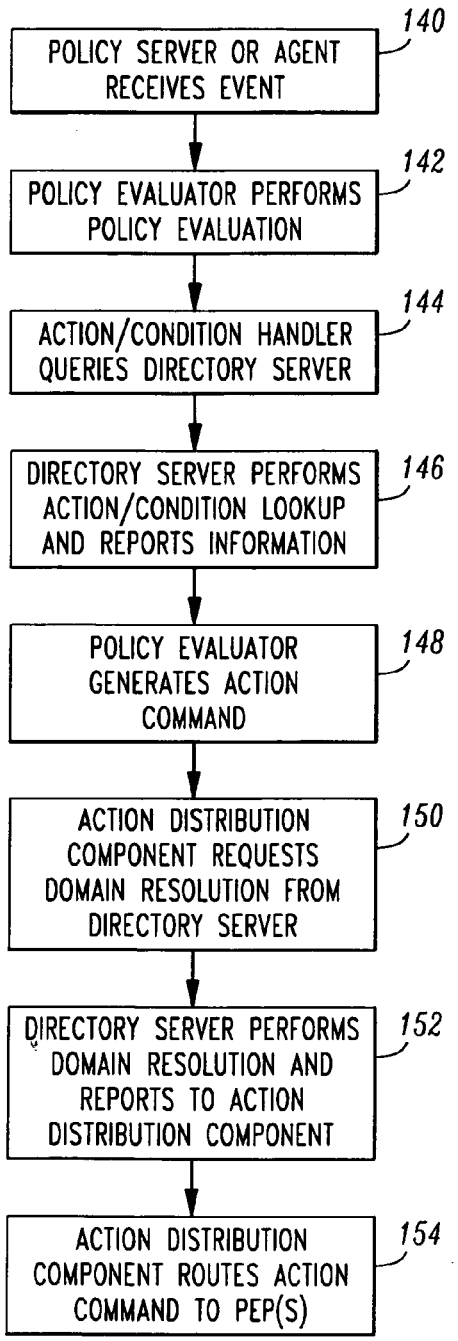

POLICY MANAGEMENT SYSTEM

CROSS-REFERENCE TO RELATED APPLICATIONS

This application is related to, and claims benefit of the filing date of, Provisional Application Ser. No. 60/165,374, entitled "Network Management Method And Apparatus," filed on Nov. 12, 1999.

TECHNICAL FIELD

This invention relates to telecommunication networks. More particularly, the invention concerns the management of telecommunication network elements during network operations.

BACKGROUND OF THE INVENTION

By way of background, a major part of managing a telecommunication network involves observing events or conditions in the network and reacting thereto by taking appropriate actions according to predetermined policies. The events or conditions being observed may range from relatively benign occurrences, such as a video-conferencing call set-up request or a service class provisioning request made by a network administrator, to potentially serious communication problems, such as a network element device being overloaded or a daemon process dying on a given network element host.

Actions taken in response to network events or conditions can be manually performed by an operator, or they may be automated by a network software system. A disadvantage of manual control is that response times may not be fast enough. A disadvantage of software control is that the control policies which cause required actions to be taken according to network conditions are quite often buried in the processing logic ("hardwired"), and are not readily adaptable to application-specific needs.

By way of example, consider the provisioning of a network switching element implementing a managed modem access gateway. Assume there are a two customers "A" and "B," each of whom gets access to a maximum of 600 modem lines from a set of 1000 modem lines. Assume that "A" has a "Gold" class of service and "B" has a "Silver" class of service, and that it costs the network service provider twice as much to deny a connection request from "A" than from "B." During peak hours, the line allocation would normally be kept at 600:400 between "A" and B, such that "A" receives its full allocation and "B" suffers a penalty. During off-peak hours, "A's" usage may average around 400, in which case it is not advantageous to keep 200 vacant lines and still deny requests from "B" when they go above 400. Ideally, the service provider would like to implement the following strategy: if sufficient lines are open, and it is off-peak time, then allow "B's" usage to rise to a point where there is just a very small buffer (say 25 open lines) for "A." At this point, if "A's" calls increase, the system begins declining new requests from "B" until there is again a safe margin reserved for "A."

Various observations can be made from the above example. A human operator's response to toggle various service classes "on" and "off" may be too slow in practice, and would not scale to scenarios that are anything but trivial. A network software system could respond much more quickly, but the notion of what constitutes "Gold" or "Silver" class would typically come hardwired with the switching element.

A better approach would be to allow the service provider to create its business model and allocate capacity based on experience and growing demands. Although conventional network software systems may offer some degree of configurability, the service provider is typically required to write its own program, in this case one that communicates with the modem pool and sets modem allocation parameters automatically. Such a programming effort may be costly, and the resulting policy may not be easily changeable.

Accordingly, there is a need for a new network management tool that overcomes the foregoing deficiencies of the prior art. Applicants submit that what is required is a network management system that provides automated network control in response to network conditions, and wherein the actions performed by the system can be specified by network service providers at system run-time in an easy-to-implement customizable fashion such that costly reprogramming (or redesign) is avoided.

SUMMARY OF THE INVENTION

The foregoing problems are solved by a run-time configurable policy management system that implements a programmable policy-based approach to managing network elements in a telecommunication network. The policy management system includes one or more policy proxies associated with the network elements and a central policy processing point in communication with the policy proxies. The policy proxies notify the policy processing point of events occurring in the network. The policy processing point is run-time programmable with one or more policies to process such events and to notify one or more of the policy proxies of actions to be taken in response thereto. The policy proxies implement these actions at the network elements they represent. The policy management system thus provides a dynamically configurable tool that allows network administrators to define their own policies and load them into (or drop them from) the policy processing points during network operations. In this way, the management of the network elements is made highly customizable and easily adaptable to the requirements of different network service providers, thereby enhancing network value.

BRIEF DESCRIPTION OF THE DRAWING

The foregoing and other features and advantages of the invention will be apparent from the following more particular description of preferred embodiments of the invention, as illustrated in the accompanying Drawing, in which:

FIG. 3 is a text diagram showing an exemplary public interface specification used by components of the policy manager of FIGS. 1 and 2;

FIG. 7 is a flow diagram showing event registration according to the first embodiment of the policy manager of FIG. 1;

FIG. 8 is a flow diagram showing event registration according to the second embodiment of the policy manager of FIG. 2;

FIG. 9 is a flow diagram showing event notification according to the first embodiment of the policy manager of FIG. 1;

FIG. 10 is a flow diagram showing event notification according to the second embodiment of the policy manager of FIG. 2;

FIG. 11 is a flow diagram showing policy processing and action distribution according to the first embodiment of the policy manager of FIG. 1;

FIG. 12 is a flow diagram showing policy processing and action distribution according to the second embodiment of the policy manager of FIG. 2;

DETAILED DESCRIPTION OF THE PREFERRED EMBODIMENT

Figure 1:
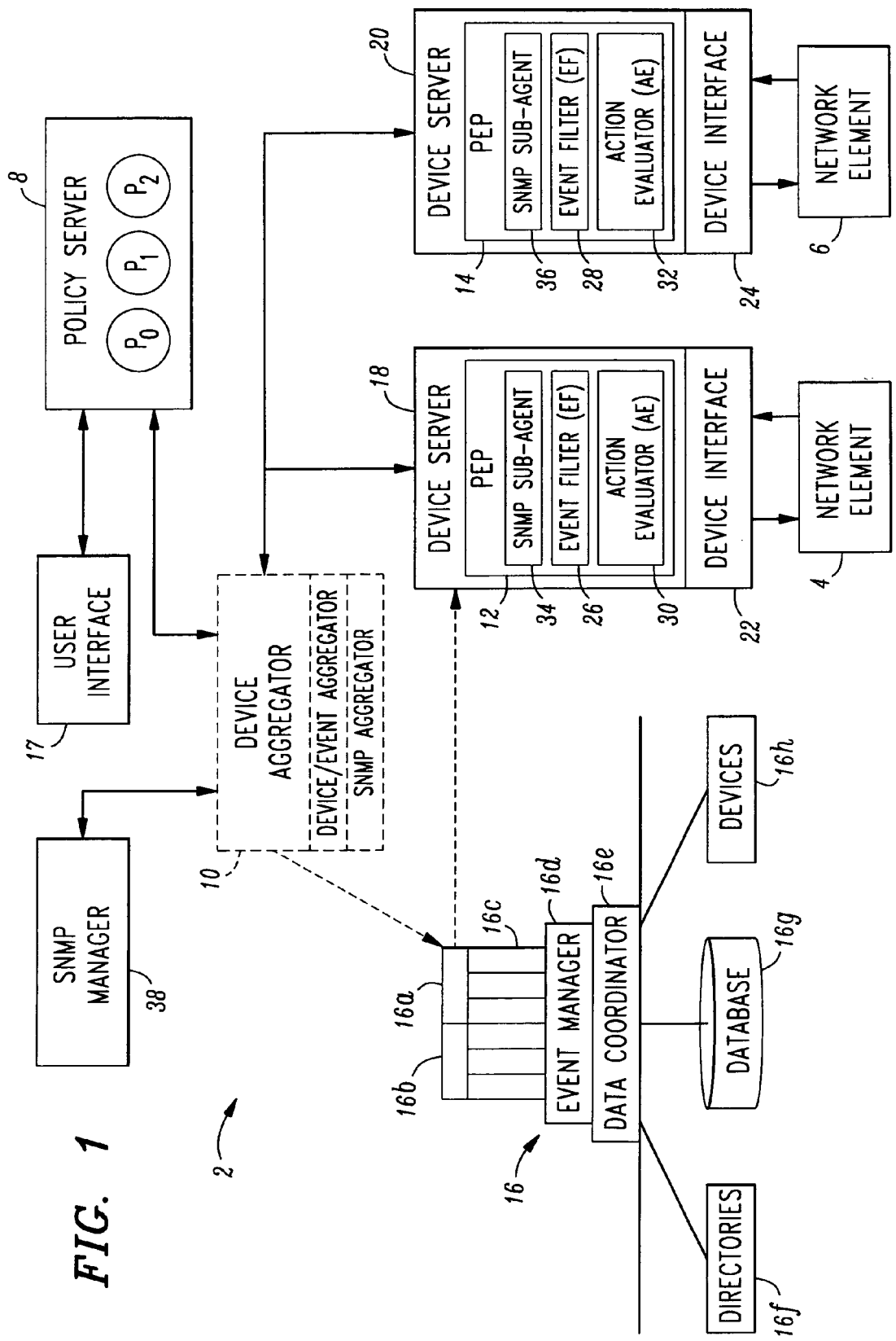
FIG. 1 is a functional block diagram showing a policy manager and related network control elements constructed in accordance with a first preferred embodiment of the invention.
Figure 2:
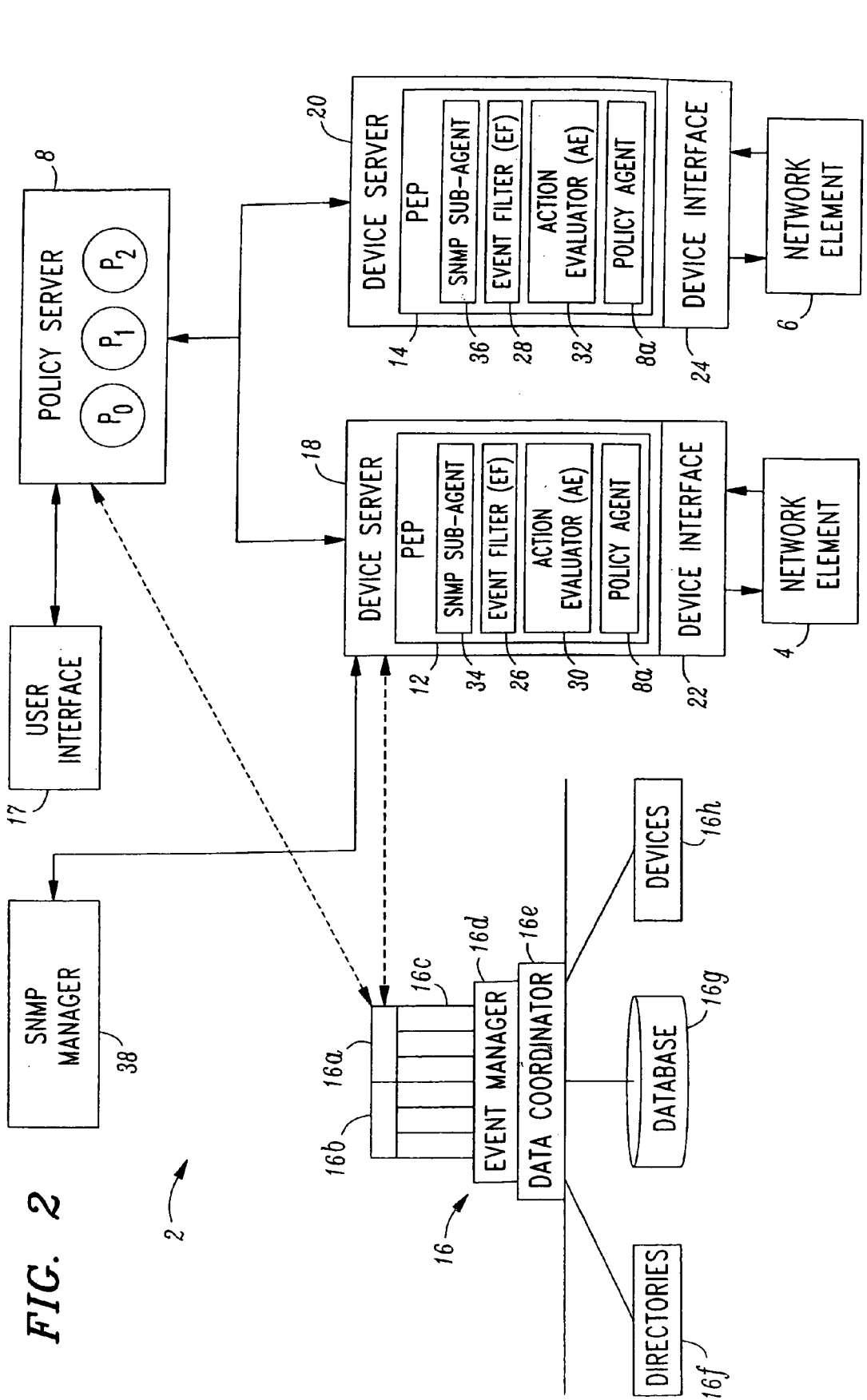
FIG. 2 is a functional block diagram showing a policy manager and related network control elements constructed in accordance with a second preferred embodiment of the invention.

Turning now to the Drawing, wherein like reference numbers indicate like elements in all of the several views, FIGS. 1 and 2 illustrate a policy manager 2 constructed in accordance with preferred embodiments of the present invention. The policy manager 2 is adapted to manage many different types of network elements, including but not limited to switches, routers, gateways, trunks, and the like. More generally, such network elements may be thought of as including any computer hardware device or software entity (e.g., a clock) that is connected to a network and performs a network-related function. Two network elements, shown by reference numerals 4 and 6, appear in FIGS. 1 and 2. The remaining components of the policy manager 2 are a central policy server 8, one or more optional distributed policy agents 8a (FIG. 2 only), an optional device aggregator 10 (FIG. 1 only), a set of Policy Enabling Points (PEPs), with one PEP (see reference numerals 12 and 14) being associated with each network element 4 and 6, and a directory server 16. A graphical or text driven user interface 17 is also provided for run-time policy loading/unloading by network administrators.

Before describing the architecture and operation of these components in detail, a discussion of policy-based network management is first presented to acquaint the reader with the overall function and purpose of the network manager 2. It will suffice for now to state that the management of the network elements 4 and 6 is largely performed by the policy server 8 and/or the policy agents 8a based on events exposed by the PEPs 12 and 14. In FIG. 1, the policy server 8 is the only policy processing component. In FIG. 2, policy processing responsibilities are distributed between the policy server 8 and multiple policy agents 8a, which agents may each be integrated with a PEP. Note that FIG. 2 also shows elimination of the aggregator 10. The events received by the policy server 8 (or the policy agents 8a) may trigger actions that result in commands being sent to the PEPs 12 and 14 for controlling or invoking services from the network elements 4 and 6. Alternatively, actions may be triggered that result in commands being sent to some other PEP, such as a PEP associated with a network logging function, a routing table, or some other network management or control entity that needs to be updated according to the events occurring at the network elements 4 and 6.

Policy-Based Network Management

The policy manager 2 is a policy-based system which uses management "logic" that can be tailored on a per-customer basis by crafting a set of measurement policies appropriate for the customer, and enforcing them via the system. Typical management tasks for which policies may be written include fault management, configuration management, performance management, security, and accounting.

Most policies can be formulated as sets of low-level rules that describe how to configure (or reconfigure) a network element or how to manipulate different network elements under different conditions. More particularly (as described in more detail below), a policy may be formulated as a specification that relates three entities: the state of one or more network elements, the context under which these elements operate, and a set of actions that can be undertaken to change the behavior of the elements, to request services therefrom, or to perform some other network management function.

Note that a network element must be "policy-enabled" in order to work with the policy manager 2. This means that each such element must perform at least one of the following two functions: (1) communicate changes of its state to the policy server 8 or a policy agent 8a, or (2) accept commands from the policy server 8 or a policy agent 8a to execute locally. Many policy enabled network elements are able to perform both functions. A network element that is not policy enabled may be part of the network, but it cannot be directly referenced by a policy.

The state of a network element is represented by the events that it generates. By way of example, a burst of incoming traffic at a network device server may generate an event which signals congestion at that element. This type of event is known as an external event insofar as it is generated by a network element that is external to the policy manager 2. The failure of a network element to respond to a signal could also generate an event, and this would be an internal event insofar as it is defined and generated by the policy manager 2. This type of event may also referred to as a "policy defined event."

Events generated by network elements are said to be primitive. In a policy rule, primitive elements can be aggregated to define basic events or complex events. For example, the simultaneous occurrence of several calls may be defined as a basic event. On the other hand, congestion at a network element followed by a failure to respond to certain stimuli may be defined as a complex event. Conjunction, alternation, and negation over primitive events can be used to define many different basic event and complex event expressions (as described in more detail below).

In writing policies, events are treated as objects that have unique names and which are associated with the event's context, which is a set of event attributes. For example, congestion at a network device server may be represented by an event named "congest" that includes a device server attribute ds, an event t and a device address ip. In that case, the congest event may be defined as follows:

| event name: | congest | |
|---|---|---|
| attributes: | ds | String; // Device Server Type |
| | t | Date; // Time of Event; |
| | ip | String; // IP address of device |

The device server context information can be used to specify a congestion event for a particular type of device server. For example, a congestion event for an SS7 device server could be specified by a network administrator using the following nomenclature: congest.ds='SS7'. The time and device address context information can be used to distinguish between events that originate from different sources having different network addresses, or which originate from the same source but at different times. For example, two congestion events from different SS7 devices at the same time could be specified by a network administrator using the following nomenclature:

congest[1].ds='SS7';
congest[1].t=20;
congest[1].ip=111,111,111.01;
congest[2].ds='SS7';
congest[2].t=20;
congest[2].ip=111.111.111.02;

Note the use of brackets to differentiate between events. In similar fashion, two congestion events from the same SS7 device but at different times could be specified using the following nomenclature:

congest[1].ds='SS7';
congest[1].t=20;
congest[1].ip=111.111.111.01;
congest[2].ds='SS7';
congest[2].t=40;
congest[2].ip=111.111.111.01;

An action is an external procedure that is executed when prescribed events occur in given contexts (according to a rule). An action may consist of a single procedure or it may consist of a workflow that ties several procedure into a more complex arrangement. An exemplary format for specifying an action is as follows:

action: reportcongestion(parameter$_1$, . . . , parameter$_n$);

In this example, the "reportcongestion" specifies some device-dependent reporting action, such as reporting a congestion incident to a network administration log file. The action takes one or more parameters of specified type, such as strings that identify the resource having the problem.

A final set of information used to perform policy management is the device address and properties of each policy enabled network element. This information can be specified in the same style as event specifications, using attribute name/attribute type pairs. A typical device/property description will resemble the following:

| device type: | device server | |
|---|---|---|
| properties: | type | string; // Device server type |
| | mfgr | string; // Brand name |
| | model | string; // Model name |
| | ip | string; // IP address |

Policies may be specified using a format that includes initial domain definitions that specify one or more hardware elements involved in the policy, an event definition, an action definition, and a policy rule definition. The following policy specification is illustrative:

```
domain alldeviceservers = (TYPE == SS7);
domain logcomputer = 111.111.111.254;
event external           cg = congest@alldeviceservers;
action recordcongestion = recordcongestion@logcomputer;
rule   cg   causes recordcongestion(cg.ds, cg.t, cg.ip);
```

Policies can be customized by network administrators to deal with virtually any exigencies arising in their networks as a results as a result of events occurring at policy enabled network elements. Such programmable policies can be written using a Policy Description Language or PDL. Although different PDLs may be implemented, a preferred PDL consists of (1) policy rule propositions that are expressions of the form:

$$\text{event causes action if condition} \quad (1)$$

and (2) policy defined event propositions which are expressions of the form:

$$\text{event triggers pde}(m_i = t_1, \ldots, m_k = t_k)$$

$$\text{if condition} \quad (2)$$

A policy rule reads: If the event occurs under the condition the action is executed. A policy defined event proposition reads: If the event occurs under the condition the policy defined event pde is triggered.

In the foregoing PDL, there is a fixed set of primitive event symbols. Policy decisions are made after a predetermined stream of primitive event instances is observed by the policy server or agent running the policy. The streams of event instances may be referred to as event histories. There may be several instances of one or more primitive events occurring at the same time (for example several calls may start simultaneously). Each set of primitive event instances occurring simultaneously (or within some pre-defined time frame) in a stream is called an epoch. An event literal is a primitive event symbol e or a primitive event symbol e preceded by !. The event literal e occurs in the epoch for each instance of the event e in the epoch. The event literal !e occurs in an epoch if there are no instances of the event e in the epoch. As described above, primitive events may have attributes (such as the time or origin of the event), and a dot "." notation is used to refer to the attribute of an event. In order to represent primitive events in policy rules, they are composed into either basic events or complex events according to the following definitions.

Definition 1: A basic event is an expression of the form:

1. $e_i$ & . . . & $e_n$, representing the occurrence of instances of $e_i$ through $e_n$ in the current epoch (i.e. the simultaneous occurrence of the n events) where each $e_i$ is an event literal, or 2. $e_i | \ldots | e_n$ representing the occurrence of an instance of one of the $e_i$s in the current epoch. Each $e_i$ is an event literal.

Note that it is sometimes desirable to group to all the instances of a basic event in an epoch into a single event. For example, the policy manager 2 may want to react with a single action if there is one or more call initiation events in the same epoch, such that an action should not be executed for each call.

In addition to basic events, the policy manager 2 should be able to handle complex events that refer to several epochs simultaneously. For example, the sequence loginFail, loginFail, loginFail may represent the event: "three consecutive attempts to login that result in failure." In general, $e_1, \ldots, e_{n-1}, e_n$, may represent an instance of the basic event $e_n$ occurring in the current epoch, immediately preceded by an instance of the basic event $e_{n-1}$ occurring in the previous epoch), . . . , and so on, with an instance of the basic event $e_1$ occurring n−1 epochs ago.

There can be described many classes of sequences by borrowing the notion of a sequence of zero or more events from regular expressions. Zero or more occurrences of an event E can be denoted by "^E".

Definition 2: A (complex) event is either a basic event, or group (E) where E is a basic event, a sequence of events $E_1, \ldots, E_n$, an event E preceded by ^, with ^E representing the sequence of zero or more occurrences of the event E, or a parenthesized event (E).

The condition of a policy rule is a sequence of predicates of the form t2t', where t and t' can be attributes from primitive events that appear in the event part of the rule, or they could be constants or the result of operations applied to the attributes of the primitive events that appear in the event. 2 is a comparison operator such as <, =, >, etc. There is a special class of operators that can used to form terms, called aggregators. For a given "generic" aggregator Agg, the syntax of the operator will be Agg(e.x, e.x2t) or Agg(e). Here, e is a primitive or policy-defined event that appears in the event part of the proposition, e.x is an attribute of e. As the name suggests, the aggregator operators are used to aggregate the x values over multiple epochs if e.x2t holds. For example, a count aggregator Count(e.x, e.x<20) can be used to count the number of occurrences of event e for which e.x<20 over multiple epochs. An aggregator could also add the values of the attribute e.x or get the largest value, etc. These aggregation terms may be applied to primitive events that appear under the scope of a caret "^" operator. The rule "$e_1, \hat{}_2$ causes a if Count(e2)=20" will execute action "a" if 20 instances of $e_2$ follow an instance of $e_1$.

The following example makes use of many features of the above-described PDL. The policy described below collects data regarding Destination Point Code (DPC) failures in a policy managed telecommunication network. It counts the number of failures per DPC and reports the results every day at midnight. There is an external event that may be called E that is generated each time a DPC fails. It has an attribute that identifies the DPC. There is also an event generated by a "clock" device every day at midnight and it is denoted by T. The policy uses an internal event called C with two attributes. There will be an instance of this event for each different DPC that will accumulate in one of the DPC attributes, namely, the error count of a DPC. The other DPC attribute will identify the DPC. The policy has three policy defined event propositions and one policy rule proposition, as follows:

E & !T & (!C|group(C)) triggers C(dpc=E.dpc, counter=0)
 if count(C[2].dpc,C[2].dpc,C[2]=E.dpc)=0;

C & E & !T triggers C(dpc=E.dpc, counter=C.counter+1)
 if C.dpc E.dpc

C & (!E|group (E)) & !T triggers C(dpc=C.dpc, counter=C.Counter)
 if count(E[2].dpc, E[2].dpc=C.dpc)=0;

C & T causes A(C.dpc, C.counter);

The first rule initiates a counter for a particular DPC. It reads: if there is an error (E), and it is not midnight (!T) and there are no counters (!C) or all the counters of group(C) refer to a different DPC (count(C[2].dpc, C[2]dpc= E.dpc)=0) trigger a new counter initialized in 0. The second rule increments the counter. The third rule copies the counter intact when the error event does not refer to the counter in question. The last rule executes a report action A at midnight for each instance of C that appears in the epoch. Indices are used to refer to different instances of E in a complex event.

Policy Manager Architecture And Operation

Summarizing the architecture and operation of the policy manager 2 in advance, each PEP (e.g., 12 and 14) is programmed to process events from an associated network element (e.g., 4 and 6). This processing is preceded by an event registration procedure which is implemented so that the PEPs can identify events that are of interest to policies that are loaded to run in the policy server 8 or the policy agents 8a. Policy related events will thus be forwarded for policy processing while non-policy related events are not reported. It is the job of the policy server 8 and the policy agents 8a to register their policy events with all PEPs being managed by a policy. In the embodiment of FIG. 1, the policy server 8 issues event registration requests to the aggregator 10, which causes event registrations to be performed at the corresponding PEPs. In the embodiment of FIG. 2, the policy server 8 and the individual policy agents 8a each perform their own event registration for the policies they run. Note that in both embodiments, the directory server 16 is used to perform domain resolution, as described in more detail below.

Following event registration, the policy manager 2 is ready to begin event notification and policy processing. In both embodiments of the policy manager 2, the PEPs typically send their events directly to the policy server 8 or policy agent 8a that has registered for the events. In the embodiment of FIG. 1, however, the aggregator 10 is sometimes used to perform protocol resolution on behalf of the PEPs. In such cases, the PEPs will to expose their events to the aggregator 10, which will then forward the events to the policy server 8.

The policy server 8 and the policy agents 8a are the components that process events received from the PEPs and which apply the policy rules to generate the policy actions. As previously described, a rule is fired if the event expressions in that rule evaluate to true and the context given by the conditions of the rule holds true. The firing of a rule results in the policy server 8 or a policy agent 8a generating one or more policy actions. Insofar as an action is represented by a procedure (see above), the firing of an action may result in an action command being sent to the event-originating PEP(s) or to some other PEP(s). Examples of typical actions carried out by PEPs are re-starting a network element, triggering an element with a particular stimulus, or changing some data structure in an interfere exposed by a network element (for example, a routing table entry). Note that action commands issued by the policy server 8 or a policy agent 8a may be sent directly to the target PEP(s). Indeed, this is normally the case when a policy agent 8a issues an action command to a PEP in which it is integrated. For the policy server 8, however, or a policy agent 8a generating an action for a remote network element, action commands are more typically sent through a domain-based routing function implemented by the aggregator 10 and/or the directory server 16. In particular, the directory server 16 maintains a domain registry that is used to derive PEP addresses for routing action commands based on the domain information defined by the policies (see above). In the embodiment of FIG. 1, the policy server 8 forwards domain-based action commands to the aggregator 10, which requests the directory sever 16 to provide PEP addresses corresponding to the specified domain(s). The aggregate 10 then routes the action commands to individual PEPs. In the embodiment of FIG. 2, the policy server 8 (or the policy agents 8a) can each issue domain queries to the directory server 10 directly, and then route their action commands according to the PEP addresses reported in response.

In the preferred embodiments of the invention, the policy manager 2 is implemented in a Java software environment. Each architectural component of the policy manager 2 represents a software layer that is built upon a base layer called a ServiceNode. Each ServiceNode is a software wrapper that can dynamically load and run any number of services when invoked by a (local or remote) requester. Such services can be implemented as Java classes conforming to a "ServiceInterface" public interface definition. FIG. 3 shows the methods exposed by this interface and illustrates how a software application associated with a component in the policy manager 2 can become service accessible from elsewhere in the network. Advantageously, the ServiceNode layer hides the complexity of communication between two services running within the same or multiple ServiceNodes. In particular, the ServiceNode layer builds its communication primitives using a Java implementation of the Styx protocol from Lucent Technologies, Inc. As is known, the Styx protocol provides a file-oriented architecture for distributed systems in which computing resources are represented by a hierarchical, tree-shaped file system name space, and wherein file system-like operations are performed to use and control such resources. It will be appreciated that other communication protocols, such as TCP/IP, could also be used.

The ServiceNodes read their configuration data on startup, and load and run the specified services within. Services can also be added and dropped dynamically while a ServiceNode is running. This mechanism is utilized to perform log-switches, alterations in debug level verbosity, and most importantly, to load and drop policies in a running system (see below). The ability to deploy ServiceNodes anywhere in a network gives a fine grained distributability, based on available network resource processing power.

PEPs

As state above, PEP stands for "Policy Enabling Point", and one PEP (e.g., PEP 12 and PEP 14) is preferably created for each hardware/software device comprising a network element that must be policy enabled. Alternatively, multi-device PEPs could be created to handle multiple hardware/software devices. A PEP may operate within a device server (e.g., device servers 18 and 20) that is in turn associated with a device interface (e.g., device interfaces 22 and 24) that controls a network element. In a broad sense, the PEP is a policy management proxy for the network element below. An inherent advantage of PEPs is that they provide a way to extend the policy manager 2 to incorporate new types of devices into the policy framework. For example, the development time may be on the order of weeks for a new family of PEPs, after which the effort involved in creating/testing a new instance of an existing PEP type would typically be on the order of a day or less.

PEPs are best described by the services that run inside them (or more particularly, their respective ServiceNodes). Apart from potentially acting as policy agents 8a (as described in more detail below) PEPs provide three services; namely: the event filter, the action evaluator, and the SNMP sub-agent.

(a) The event filter (EF) (see reference numerals 26 and 28 in FIGS. 1 and 2) is a PEP service that aggregates/translates/maps lower level "world events" from a given network element into the primitive events that are understood by the policy manager 2. A first benefit of the event filter is that a given semantic event can be raised in different forms by different devices made by different vendors; but for the purposes of writing a policy, these differences need to be abstracted out. The event filter does this. Secondly, as described above, it is often the case that several primitive events raised from a device make up a basic or complex policy event (e.g. about six or seven primitive events indicate a call set-up that must then be aggregated into a counter event keeping track of calls answered per customer). The event filter can be programmed to do this as well. Thirdly, there are times when a PEP should raise certain internal events that are not produced by the network element to which the PEP is connected. An example of this scenario is a "disconnect" event raised internally by a PEP to notify a "fault-management" policy. This is also a function of the PEP event filter. Note that the event filter 26 of each PEP also maintains a registry of events that have been registered with the PEP by the policy execution engine 8.

(b) The action evaluator (AE) (see reference numerals 30 and 32 in FIGS. 1 and 2) is a PEP service that can execute local or remote actions to affect changes in the network element being managed by the PEP. This reasoning is almost identical to, but reverses the logic behind, the event filter. A given policy action often translates into a set of command-line prompts/actions against a device, or sometimes an SNMP command set into that device. The action evaluator provides the abstraction of the same semantic actions across a spectrum of devices.

(c) The SNMP subagent (see reference numerals 34 and 36 of FIGS. 1 and 2) reports the health state of the device connected to the PEP to an external SMNP manager 38, if present (e.g., an SNMP manager executing the Open View™ software from Hewlett Packard Corporation). This is useful not only for collection of performance and error statistics, but also to provide another channel for affecting on-demand configuration changes in the device. Some of the simpler policy actions, in turn, may map into a single SNMP command set against a well-defined variable associated with device.

Aggregator

The aggregator 10 of FIG. 1 is used to provide an intermediate routing component between the policy engine 8 and the PEPs, and between the SNMP manager 38 and the PEPs. The aggregator 10 (or more particularly, its ServiceNode) runs a device/event aggregator and an SNMP aggregator:

(a) The device/event aggregator provides event registration and notification services to the policy server 8. In particular, when the policy server 8 desires to register policy events with a group of PEPs managed by a policy, it specifies the PEP domain information to the device/event aggregator and requests event registration at all PEPs within the domain. The device/event aggregator then completes the event registration in a manner to be described in more detail below. Following event registration, the principal role of the device/event aggregator is to route action commands to the PEPs when a policy rule fires using domain resolution. As also stated, the device/event aggregator can be used to route events to the policy server 8 that require protocol translation. The device/event aggregator can thus be characterized as a router (in both the uplink and downlink directions) and a domain resolver for policies.

(b) The SNMP Aggregator allows users to query the "global view" of the network by letting operators query a single point (the aggregator 10) and obtain information on all the components involved in a current installation of the policy manager 2.

Directory Server

The directory server 16 is a common component used by other policy manager components to provide a platform independent resource for persistent storage, while exposing an interface (e.g., Java or LDAP (Lightweight Directory Access Protocol) to access the data. The directory server 16 acts as a directory coordinator for a metadirectory that provides uniform access to multiple types of directories transparently. It exposes a RegistryService interface 16*a* that can be used by other policy manager components to access data resident in various underlying data sources, and thus offers data storage transparency. The directory server 16 also offers schema transparency in the sense that various components of a schema may refer to different underlying storage systems. It also offers access-protocol transparency in that the underlying storage systems may be accessed by a variety of protocols, such as LDAP, RDBMS, SIP, and TCAP.

The directory server 16 is used by the components of the policy manager 2 to keep persistent state information that they may need to locate and establish communication links with other components, and also to perform state recovery by conversing with other components when, for example, one component dies and is restarted. Also, as described above, it is the directory server 16 that maintains the domain registry for the domains defined by the policies running in the policy server 8 and the policy agents 8*a*.

In an exemplary setup, the directory server 16 includes, in addition to the RegistryService interface 16*a*, various other services 16*b*, multiple protocol views 16*c* to an event manager 16*d*, and a data coordinator 16*e*. The data coordinator 16*e* can be implemented as a conventional database storage manager, such as an object oriented database storage system, that manages one or more directories 16*f*, databases 16*g* and storage devices 16*h*.

Policy Sever and Policy Agents

The policy server 8 and (optionally) the policy agents 8*a* (or more particularly, their ServiceNodes) run the policy manager's policies as individual services inside them, providing an insulated environment for each policy. Policies may be written as PDL files in text format, and in the preferred embodiment of the invention, the text files are then compiled into Java class files. Policy files can be loaded into or dropped from the policy manager 2 at run time via the user interface 17. If desired, a separate service call Admin-Service (not shown) can be attached to the policy manager 2 in order to provide remote access thereto. In either case, network administrators are able to perform dynamic loading/unloading and restarting of policies within the policy server 8 (and the policy agents 8*a*) during network operations and without taking the policy manager 2 out of service. Each policy run by the policy server 8 or a policy agent 8*a* represents a state machine that processes its policy-defined events in real time. As described above, when a policy rule fires, one or more action commands are generated and then distributed to one or more PEPs. Additionally, a policy defined event may be generated.

Figure 4:
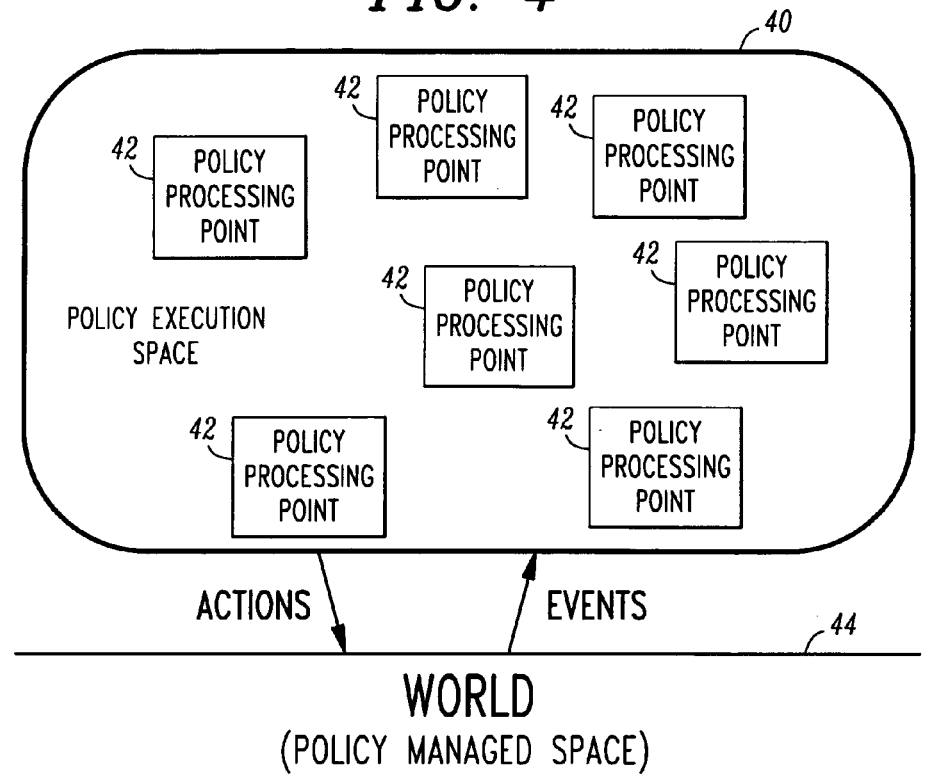
FIG. 4 is a functional block diagram showing the distribution of policy processing functionality in the policy manager of FIG. 2.

FIG. 4 provides a generalized notion of policy processing in the policy manager 2. In particular, the policy manager 2 may be thought of as comprising a policy execution space 40 that contains one or more policy processing points 42. Relating FIG. 4 to FIG. 1, the policy server 8 is a policy processing point 42 in a policy execution space that includes only a single policy processing point. Relating FIG. 4 to FIG. 2, the policy server 8 and the policy agents 8*a* are each a policy processing point 42 in a policy execution space that includes multiple policy processing points. As further shown in FIG. 4, each policy processing point 42 communicates with the outside world, representing a policy managed space 44, via policy events and actions.

Figure 5:
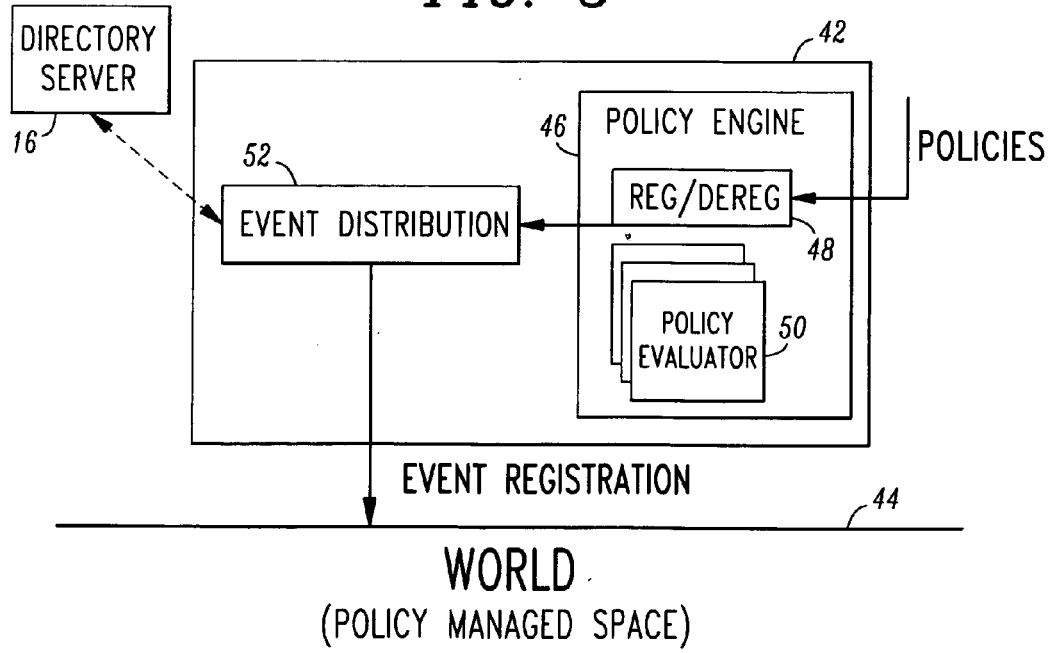
FIG. 5 is a functional block diagram showing policy processing components for performing event registration.
Figure 6:
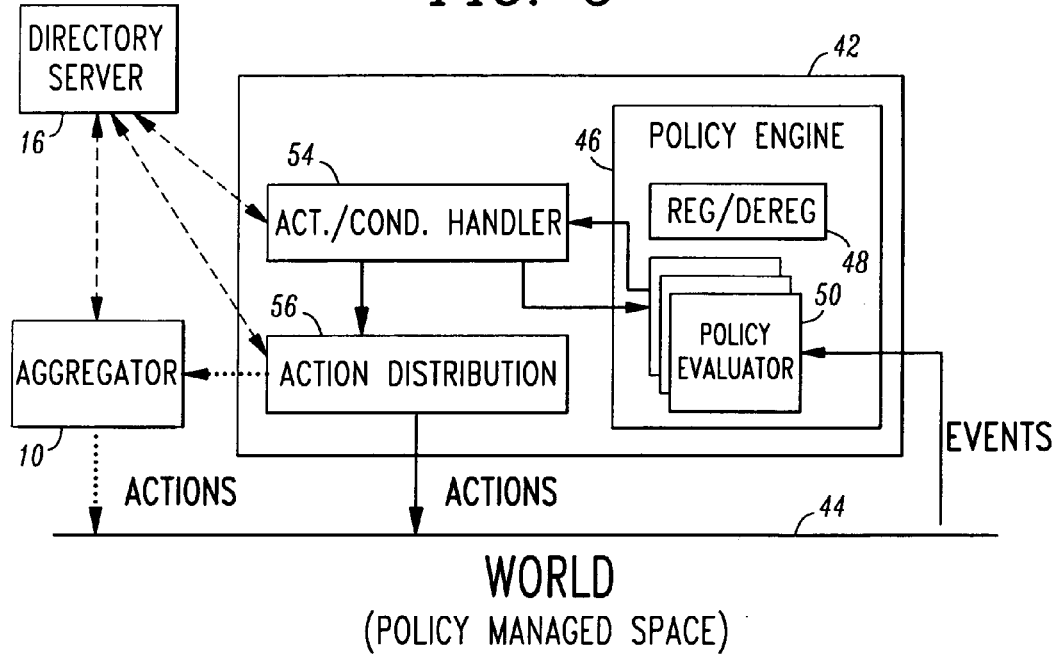
FIG. 6 is a functional block diagram showing policy processing components for performing policy processing and action distribution.

Directing attention to FIGS. 5 and 6, the components responsible for event registration, policy processing, and action distribution at each policy processing point 42 will now be described. As shown, each policy processing point 42 includes a policy engine 46. Within the policy engine 46 is a registration/deregistration unit 48 and one or more policy evaluators 50. FIG. 5 further shows an event distribution component 52, and FIG. 6 shows an action/condition handler 54 and an action distribution component 56. The operation of these components will now be described.

Policy Loading And Message Flow

Policy execution in the policy manager 2 is implemented after one or more policy files are loaded into a policy processing point's ServiceNode to implement the defined policies. Each policy is implemented according to four main stages: (1) Domain Definition, (2) Event Registration, (3) Event Notification, and (4) Action Execution.

(1) Domain Definition

As previously described, the first block of a policy file includes a set of domain definitions. The domain definitions are used to group the network elements producing the events used by the policy, and the network elements that are acted upon by the policies actions. These domain definitions are stored in the domain registry maintained by the directory server 16 in association with the addresses of PEPs that are assigned by a network administrator to the domains. To understand the usefulness of domain registration, consider that without this capability, a policy would register for events (see below) by using either a wild-card symbol that causes registration at every PEP which raises a given event, or a list of known PEP names. In either case, this resolution would be done statically, when the policy starts up. Action command routing would be performed in similar fashion. Because a long running system requires the notion of event-registration and action-execution domains that grow and shrink over time, the above-described domain definitions are incorporated into policies. As and when new PEPs are brought into the system, and are domain-registered with the directory server 16, the policy will be able to dynamically include them in its state. Thus, support is provided for domain expressions and resolution, and dynamic domain updates.

(2) Event Registration

The second block of a policy file includes a set of declarations about the events at network elements that the policy is interested in acting upon. This declaration block is translated into a set of event registrations that are performed using the aggregator 10 (if present) or by the policy server 8 and the policy agents 8a (if the aggregator 10 is not present). FIGS. 7 and 8 show processing steps performed during event registration under each of these scenarios, according to the policy manager embodiments of FIGS. 1 and 2, respectively.

As shown in FIG. 7, in the embodiment of FIG. 1, a network administrator loads a policy into the policy manager 2 in step 60 (e.g., as a PDL or Java class file) via the user interface 17. As shown in FIG. 5, the policy is received at the policy engine 46 and the policy event declarations are processed by the policy server's registration/deregistration unit 48. In step 62, the policy server 8, and particularly its event distribution component 52 (see FIG. 5), requests the aggregator 10 to perform event registration and provides the domain information for the PEPs involved in the policy whose events are being registered. In step 64, the aggregator 10 requests the directory server 16 to perform domain resolution to identify the individual PEPs that are to receive the event registrations. In step 66, the directory server 16 performs domain resolution and reports the PEP addresses back to the aggregator 10. In step 68, the aggregator 10 routes the event registration information to each identified PEP. In step 70, the PEPs receive and locally store the event registration information in their event filters.

As shown in FIG. 8, in the embodiment of 2, a network administrator loads a policy into the policy manager 2 in step 80 (e.g., as a PDL or Java class file) via the user interface 17. Insofar as the policy manager 2 of FIG. 2 includes the policy server 8 and multiple policy agents 8a, the administrator must specify which of these policy processing points is to be loaded with the policy. As shown in FIG. 5, the policy is received at the specified policy server's or policy agent's policy engine 46 and the policy event declarations are processed by the registration/deregistration unit 48. In step 82, the policy server 8 or policy agent 8a, and particularly its event distribution component 52 (see FIG. 5), sends domain information to the directory server 16 for the PEPs involved in the policy whose events are being registered, and requests that the directory server perform domain resolution to identify these PEPs. In step 84, the directory server 16 performs domain resolution and reports the PEP addresses back to the policy processing point 40. In step 86, the event distribution component 52 of the policy server 8 or policy agent 8a routes the event registration information to each identified PEP. In step 88, the PEPs receive and locally store the event registration information in their event filters.

As earlier described, the event registration information is consulted whenever an event is raised at a PEP, and the event is forwarded for delivery to any policy that has registered for the event. This has two advantages. First, the policy manager 2 will work without any form of polling, which can be bandwidth expensive. Instead, the PEPs themselves identify the events that are of interest to the policy. Second, the PEPs will filter out a majority of the events a network element may raise to the extent that there is no interest expressed in them by a policy.

(3) Event Notification

Once the registration phase is over, the policy manager 2 does not have to do anything proactively. As and when the specified events are raised at the various PEPS, they are forwarded to the appropriate policy processing point 40, i.e., the policy server 8 or a policy agent 8a. This processing is shown in FIG. 9 for the policy manager embodiment of FIG. 1, and is shown in FIG. 10 for the policy manager embodiment of FIG. 2.

As shown in FIG. 9, in the embodiment of FIG. 1, an event is received at a PEP from its associated network element in step 90. In step 92, the PEP performs event filtering and determines whether any policies have registered for the event. In step 94, the PEP determines whether to forward the event directly to the policy server 8 or to route it through the aggregator 10 for protocol resolution. If the decision in step 94 is to forward the event directly, this is done in step 96. If the decision in step 94 is to route the event through the aggregator 10, the event is sent there in step 98. The aggregator 10 performs protocol resolution in step 100 and then forwards the event to the policy server 8. In step 102, the policy server 8 receives the event and is ready for policy processing.

As shown in FIG. 10, in the embodiment of FIG. 2, an event is received at a PEP from its associated network element in step 110. In step 112, the PEP performs event filtering and determines whether any policies have registered for the event. In step 114, the PEP forwards the event directly to the policy server 8 or to a policy agent 8a, which could be the PEP's own integrated policy agent 8a. In step 102, the recipient policy server 8 or policy agent 8a receives the event and is ready for policy processing.

(4) Action Execution

Based on the external and/or internal events that are received, a policy's rules may fire at some moment. At this point, the policy rules may request an action to be taken at one or more PEPS. These actions are routed (or sent directly) to the respective PEPs. The PEPs may execute the actions by i) executing a local cached method, ii) loading a class dynamically and invoking a method within the class, or iii) accessing a remote well-known service somewhat in the network, and having it execute the desired action. It should also be noted that some actions may be generated locally at the PEPs themselves, based on their integrated policy agent's internal processing of events. The power to execute arbitrary actions over network elements, and the various modes mentioned above, yield immense power and completeness to the system.

FIGS. 11 and 12 illustrate the foregoing action execution processing for the embodiment of FIG. 1 and the embodiment of FIG. 2, respectively.

As shown in FIG. 11, for the embodiment of FIG. 1, the policy server 8 receives an event in step 120. As shown in FIG. 6, the event is received at the policy server's policy evaluator 50. In step 122, the policy evaluator 50 performs policy evaluation. Because this procedure may depend on previous actions and/or conditions occurring at a network element that is remote from the policy server 8, the action/condition handler 54 may be used to query the directory server 16 in step 124 to determine where the action/condition can be checked, and how it can be checked (i.e., the protocol to use for obtaining the information). The directory server 16 performs the action/condition lookup in step 126 and reports back to the action/condition handler 54, which in turn reports to the policy evaluator 50. In step 128, the policy evaluator 50 completes policy processing and generates an action command. After the action command is generated by the policy evaluator 50, it is routed by the action distribution component 56 to the aggregator 10 in step 130. The aggregator 10 then requests domain resolution from the directory server 16 in step 132. In step 134, the directory server 16 performs the domain lookup and reports the PEP address information to the aggregator 10. In step 136, the aggregator 10 distributes the action command for execution at one or more PEPs.

As shown in FIG. 12, for the embodiment of FIG. 2, the policy server 8 or a policy agent 8a receives an event in step 140. As shown in FIG. 6, the event is received at the policy server's or policy agent's policy evaluator 50. In step 142, the policy evaluator 50 performs policy evaluation. Because this procedure may depend on previous actions and/or conditions occurring at a network element that is remote from the policy server 8 or policy agent 8a, the action/condition handler 54 may be used to query the directory server 16 in step 144 to determine where the action/condition can be checked, and how it can be checked (i.e., the protocol to use for obtaining the information). The directory server 16 performs the action/condition lookup in step 146 and reports back to the action/condition handler 54, which in turn reports to the policy evaluator 50. In step 148, the policy evaluator 50 completes policy processing and generates an action command. After the action command is generated by the policy evaluator 50, the action distribution component 56 requests domain resolution from the directory server 16 in step 150. In step 152, the directory server 16 performs the domain lookup and reports the PEP address information to the action distribution component 56. In step 154, the action distribution component 56 distributes the action command for execution at one or more recipient PEPs.

As previously stated, the code for all policy manager components of the preferred embodiments of the invention can be written in Java, and may use the Styx protocol as the communication protocol to talk among components. In these preferred embodiments of the invention, it has been observed that the policy manager 2 will handle several thousand events per minute in steady state. Occasional bursts of over fifty times the steady state capacity have also been noted. When this happens, however, events may get buffered at the aggregator 10 (if present), or at other points, and the system may suffer a lag in clearing them.

Software Switch Implementation of the Policy Manager

A preferred operating environment for the policy manager 2 is a software switch, such as the Softswitch™ product developed at Lucent Technologies, Inc.'s Bell Laboratories. The Softswitch™ system is a distributed software switch for IP networks that couples the reliability and features of public telephony with the cost effectiveness of IP technology. The Softswitch™ system allows network service providers to develop communication services that are indistinguishable from traditional circuit networks. In particular, it solves the problem of handling multiple protocols when developing inter-operable services across endpoints. An example would be making a call from a NetMeeting client using a variant of the H.323 protocol to a Lucent Mediatrix™ client that uses Session Initiation Protocol (SIP), or even to a PSTN (Public Switched Telephone Network) phone.

The Softswitch™ system is a pure software, Java-based, distributed software switch whose components can be run on standard workstation hardware. The system abstracts away specific protocols by translating industry-signaling protocols into a generic call-signaling format called "Mantra" that is built on top of the Styx communication protocol. In addition, it provides an API for rapid prototyping of new applications while providing protocol handling.

Figure 13:
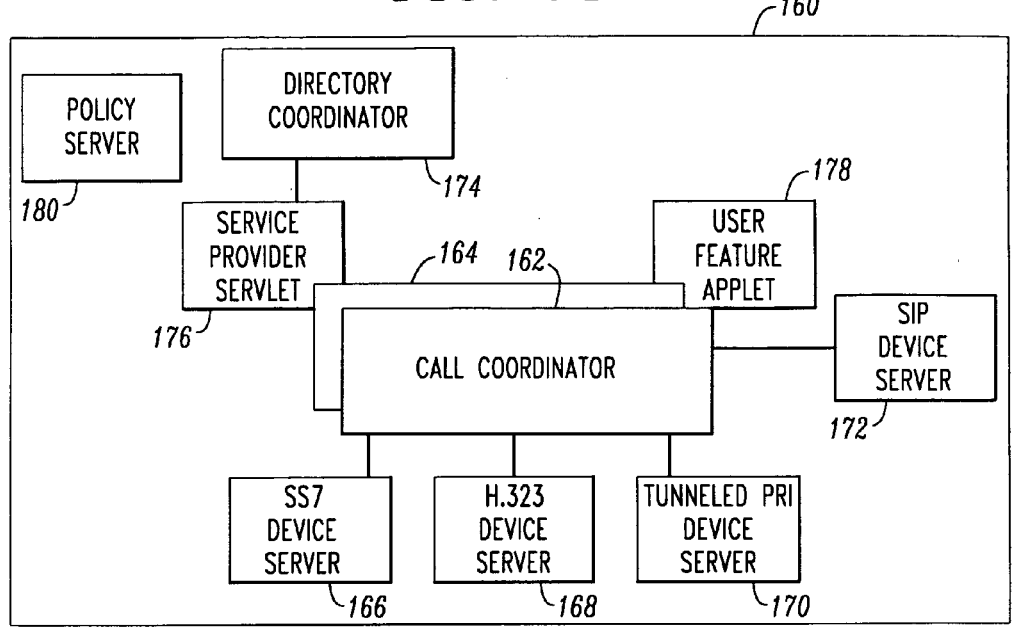
FIG. 13 is functional block diagram showing a telecommunication network software switch incorporating a policy manager in accordance with FIG. 1 or 2.

FIG. 13 is a functional block diagram showing the architecture of a software switch system 160. The system can be viewed as comprising a set of software components that reside on a single hardware platform or which can be distributed across multiple geographically separated hardware platforms. These components include one or more call coordinators (e.g., 162 and 164), device servers (e.g., 166, 168, 170 and 172), directory coordinators (e.g., 174), service provider servlets (e.g., 176), and user feature applets (e.g., 178). In addition, the software switch system 160 implements a policy server 180 in accordance with the present invention, e.g., according to the described construction of the policy server 8. Note that PEPs of the type described relative to FIG. 1 can be loaded into the device servers 166, 168, 170 and 172 to complete the incorporation of policy manager functionality within the software switch system 160 in accordance with the first embodiment of the invention. Alternatively, PEPs of the type described relative to FIG. 2 (i.e., containing policy agents 8a) can be loaded into the device servers 166, 168, 170 and 172 to complete the incorporation of policy manager functionality within the software switch system 160 in accordance with the second embodiment of the invention.

The device servers 166, 168, 170 and 172 are software entities that normalize signaling information to and from network endpoints by performing protocol translation. In particular, the device server 166 is a protocol handler for an SS7 (Signaling System 7) interface, the device server 168 is a protocol handler for an H.323 interface, the device server 170 is a protocol handler for a PRI tunnel interface, and the device server 172 is a protocol handler for a SIP interface.

The call coordinators 162 and 164 are software entities that are in charge of call processing. They manage individual calls or sessions, maintain call state, and are the entities that coordinate multiple device servers for accomplishing communication.

The service provider servlet 176 is a software entity that provides service-specific features for calls. It comprises active code that controls the basic call model embedded in an associated one of the call coordinators 162 and 164 for controlling calls on a system-wide basis.

The user feature applet 178 is a software entity that works in conjunction with the service provider servlet 176 to provide customization of user features on a per-call basis.

Exemplary Software Switch Installation

Figure 14:
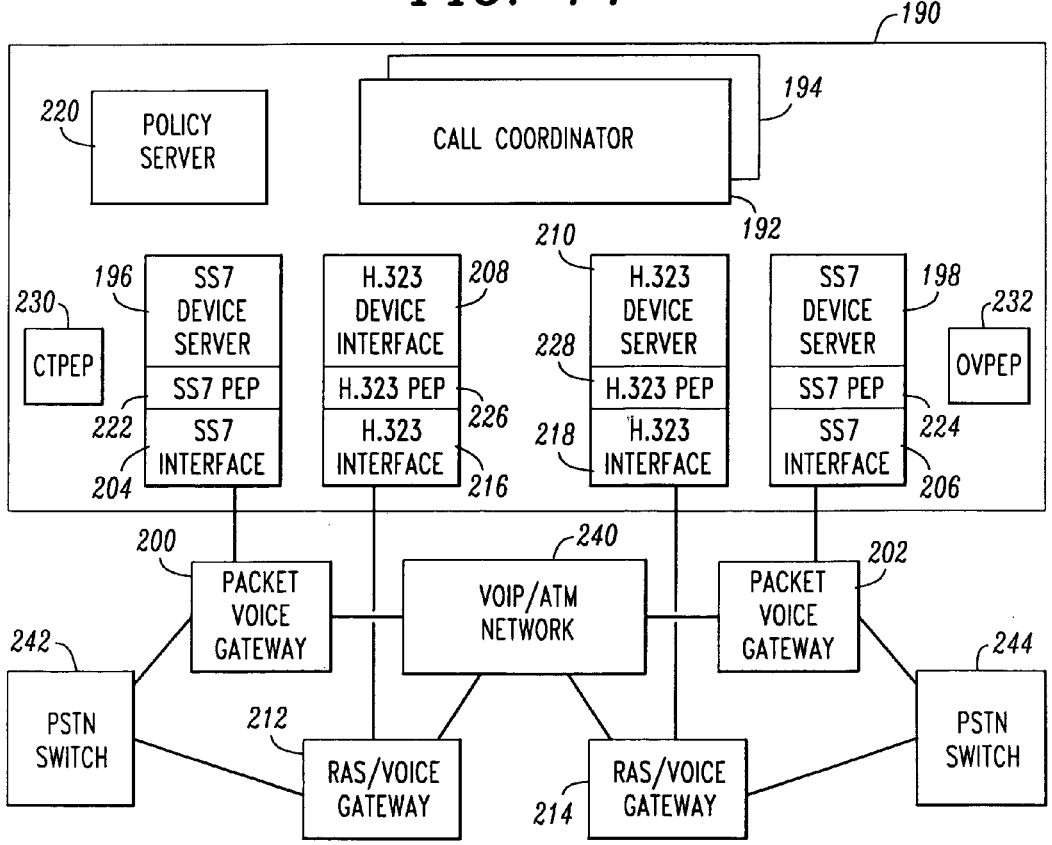
FIG. 14 is a functional block diagram showing another telecommunication network software switch incorporating a policy manager in accordance with FIG. 1 or 2.

Turning now to FIG. 14, an exemplary installation of a policy manager-enabled software switch system 190 is shown. The software switch system 190 is implemented with two call-coordinators 192 and 194, two SS7 device servers 196 and 198 that respectively connect to packet voice gateways 200 and 202 via SS7 protocol interfaces 204 and 206, two H.323 device servers 208 and 210 that connect to two RAS (Remote Access Server)/voice gateways 212 and 214 via H.323 protocol interfaces 216 and 218, and a policy server 220. Four PEPs 222, 224, 226 and 228 are respectively associated with the device servers 196, 198, 208 and 210. Note that one or more of such PEPs may contain a policy agent (not shown), depending on implementation preference. In addition there is a controlled timer PEP (CTPEP) 130 that generates clock tick events, and an OVPEP 232 that converts internal software switch system alarms into appropriate SNMP traps and sends them off to multiple network control centers (not shown). The voice gateways 200 and 202, and the RAS/voice gateways 212 and 214, are connected to an IP/ATM transport network 240 and to a pair of PSTN switches 242 and 244.

Each event that is handled by the policy server 220 or any policy agent that is present can be implemented as a data structure that is filled at the event source, and which carries information to the policy server or agent. The event data structures may be realized by a hierarchy of Java classes, so that lower events specialize their parents. An advantage of this hierarchical structure is that when a policy needs to perform the same action for a given event sub-tree, it can simply express that goal in one rule that works on the root of the sub-tree.

Figure 15:
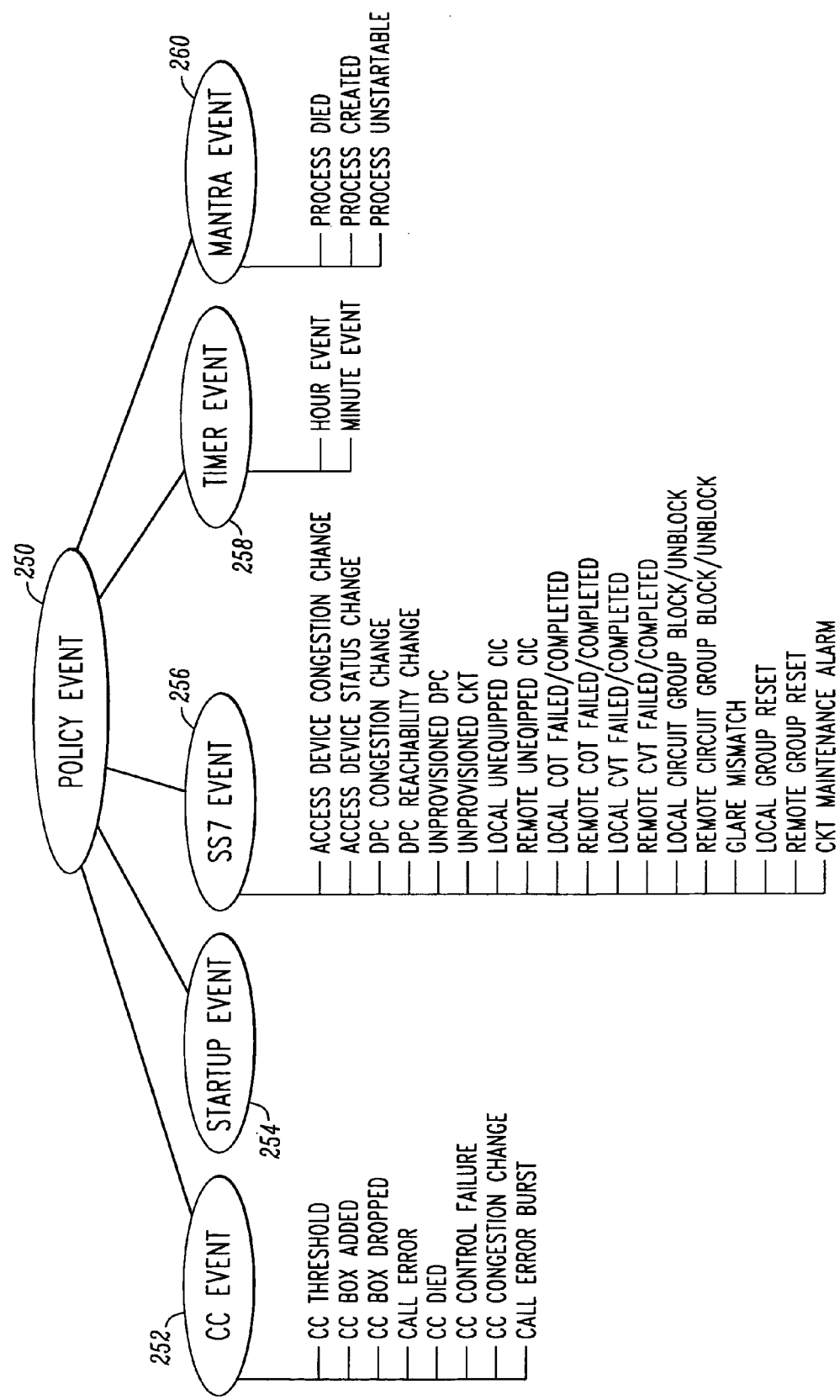
FIG. 15 is a functional block diagram showing a hierarchy of network events which can be managed by a policy manager in accordance with FIG. 1 or 2.

FIG. 15 shows an exemplary event hierarchy comprising events that are specific to the installation of FIG. 14. In this hierarchy, there is a top level event class called "Policy Event" (shown by reference numeral 250). The Policy Event class is the parent of five child event classes that are respectively labeled "CC Event," "Startup Event," "SS7 Event," "Timer Event" and "Mantra Event." These child event classes are respectively shown by reference numerals 252, 254, 256, 258 and 260. With the exception of the Startup Event Class 254, each of the child event classes is in turn a parent of a number of individual events, as listed in FIG. 15.

Several policies may be written for the installation of FIG. 14 in order to respond to the various events shown in FIG. 15. These policies will now be briefly described to provide a flavor of the types of policies that may be implemented by a policy manager operating in accordance with the invention.

One of the policies that may be written for the installation of FIG. 14 is an alarm monitoring/filtering policy. The purpose of the policy is to collect events from internal processes of the software switch system 190 and present them as SNMP traps to a management node (not shown), such as an SNMP manager. An actual PDL file for such an alarm monitoring/filtering policy is shown below. The events being monitored are listed under the headings "External Events" and "Internal Events." The policy rules are listed under the "Rules" heading. The actions taken by the policy are listed under the "Actions" heading:

Alarm Policy

[External-Events]
SS7Event=com.lucent.netmon.events.SS7Event@*;
Callerror=com.lucent.netmon.events.CallError@*;
CCBoxAdded=com.lucent.netmon.events.CCBoxAdded@*;
CCBoxDropped=com.lucent.netmon.events.CCBoxDropped@*;
CCThreshold=com.lucent.netmon.events.CCThreshold(@*;
CCControlFailure=com.lucent.netmon.events.CCControlFailure@a*;
CCCongestionChange=com.lucent.netmon.events.CCCongestionChange@*;
UPEvent=com.lucent.netmon.events.UnParsedEvent@*;
NMEvent=com.lucent.netmon.events.NetmonEvent@*;
[Internal Events]
SEvent=policy.events.StartUpEvent;
[Actions]
OVAction=com.lucent.netmon.pep.pepServices.openView.OpenViewTrapService.sendTrap#OVpep;
[Rules]
[SEvent, CallError]
causes OVAction ("com.lucent.netmon.events.PolicyEvent", CallError.toString( ));
[CallError, CallError]
causes OVAction ("com.lucent.netmon.events.CallCoordinatorEvent", CallError[2].toString( ))
If CallError[2].getCreateTime( )-CallError[1].getCreateTime( ) > 3000;
SS7Event
causes OVAction ("com.lucent.netmon.events.SS7Event", SS7Event.toString( ));
UPEvent Alarm Policy -continued causes OVAction ("com.lucent.netmon.events.PolicyEvent", UPEvent.toString( ));
NMEvent
causes OVAction ("com.lucent.netmon.events.PolicyEvent", NMEvent.toString( ));
CCBoxAdded
causes OVAction ("com.lucent.netmon.events.CallCoordinatorEvent", CCBoxAdded.toString( ));
CCBoxDropped
causes OVAction ("com.lucent.netmon.events.CallCoordinatorEvent", CCBoxDropped.toString( ));

As can be seen from the foregoing policy, most of the rules of the alarm monitoring/filtering policy are designed to fulfill the goal of collecting events from internal software switch system processes and present them as SNMP traps to a trap service implemented by the management node. This service is labeled "OpenViewTrapService" because the preferred management node of the Lucent Softswitch™ system is an SNMP manager running the OpenView™ SNMP management software from Hewlett Packard Corporation. One of the rules, labeled "CallError, CallError" performs the additional function of suppressing multiple CallError event messages, one for each call actively in progress, from being sent to the management node in situations where a link between two software processes breaks for some reason. The "CallError, CallError" rule suppresses multiple CallError events if they happen within some configurable time t after a previous CallError instance.

Another policy that may be written for the installation of FIG. 14 is one that serves to count error bursts. Because the alarm monitoring/filtering policy suppresses the fact that there may be a burst of call errors, the count error policy would run in parallel to the alarm monitoring/filtering policy, and count the number of call error events seen in an error event burst. It would then report at the end of the burst (detected by a few time pulses without the same event) a customized event to the management node, with a count of the errors in the previous burst. This policy would require that the CTPEP 230 be run to generate clock events at fixed frequency.

Another policy that may be written for the installation of FIG. 14 is a nightly reload policy. This policy would force each of the software processes of the software switch system 190 to perform an internal reload of its configuration by re-reading the system database (e.g., by invoking the directory server 16) once per day (e.g., at midnight).

Another policy that may be written for the installation of FIG. 14 is one that monitors errors on a per-DPC basis. Usually a given number of errors per day in completing calls is acceptable. However, if there errors are concentrated on a given trunk (identified by a destination point code), there is cause for concern. The errors-per-DPC policy would maintain counters for errors on a per DPC basis and produce a periodic report for network administrators.

A further policy that may be written for the installation of FIG. 14 is a fail over policy. The purpose of this policy would be to control which set of software switch system processes will serve as a backup for another set of such processes. In other words, if a "Process Died" event is seen, this policy would determine which process on which host to restart based on the parameters in the event.

The above policies are described for purposes of example only. It will be appreciated that these policies could be readily revised or replicated to perform similar actions for other events.

Handling Policy Manager Failover and Upgrades

A common question asked of any monitoring/management layer for a software system is how to detect an error in the monitoring/management layer itself. Typically, the solution lies in making the topmost layer very highly reliable and available, and having it perform a limited amount of self-monitoring. In the case of the policy manager 2, and given that the policy manager manages/monitors a telecommunications network, there will be stiff requirements for low-down-time-per-year and no-downtime-for-upgrades. A strategy to handle both of these requirements can be described under two areas: i) single component failure handling, and ii) entire system failover strategy. The latter is used to perform upgrades as well. Both are discussed below.

(1) Component Failure

As previously described, the core components of the policy manager 2 (referring now to FIG. 1) are the policy server 8 and policy agents 8a, the aggregator 10 (if present), the PEPS 12 and 14, and the directory server 16. Recovery on each of these components can be performed according to the following rules.
(a) Each component gets restarted by an external monitoring script if it dies or gets killed abruptly;
(b) Components will go into a retry mode if they cannot find another entity they are looking for, and will use system directory resources (e.g., via the directory server 16) to refresh the location of the missing entity;
(c) PEPs will raise internal alarms if they get disconnected from, or cannot reach, the devices they monitor for a period of time;
(d) The aggregator 10, if present, maintains state on event registrations performed at each PEP, otherwise, the PEPs maintain their own event registration state;
(e) The aggregator 10, if present, is monitored by the policy server 8 for connection status, and the policy server 8 will reload its policies upon a reconnect should the aggregator get rebooted; and
(f) The policy server 8 and policy agents 8a use the directory server 16 to remember the policies they need to run.

The above rules interplay to provide component-based recovery with the following caveat: In a few situations, several events may be missed (e.g., restarting PEPs), or the policies will be reset (i.e., if the aggregator 10 or the policy server 8 or a policy agent 8a dies). Failure of the directory server 16 will prevent the system from performing a "recovery from failure" but otherwise will not affect the operation of a system in steady-state.

(2) Failure Using Replicated Hardware

In this scheme, all processes in the policy manager 2 are replicated on identical hardware systems. Instances are marked active or passive, and two sets of PEPs, one for each hardware system, point to the "active" instance of the device servers. Should an active process fail, the corresponding PEP can raise a disconnect event, causing the built-in failover policy to trigger its passive counterpart to take over.

For an internal failover in the policy manager 2, a key addition to the architecture is a set of "peer" PEPs that cross-mount each other and perform a keep-alive protocol between them. All event registrations and other startup activities are performed in both active and passive systems, except that the passive system's policy server and policy agents are not normally allowed to advance their policy engine state machines for the policies. Disconnect from the active peer-PEP causes the backup policy server/agent's policy engine to start advancing the policies.

The above mechanism may also be used for performing software upgrades. This can be done by first loading a new version of the software in the passive system, running the same set of policies, and then stopping all processes in the active version. The upgraded system takes over because of the built in failover policy. The only loss suffered is that the policy automata are reset.

Additional Features

Additional features that may be incorporated in the policy manager 2 of the present invention include:

(1) Enhanced Administrative Support

Support for network administrators can normally be limited to a small GUI (Graphical User Interface) (such as the user interface 17) that the administrators can use to drop and load policies at run-time and which may also display current policies that are running. As previously indicated, the policies can be written as PDL text files that are then compiled as Java class files. Alternatively, an administrative layer can be added that provides drag-and-drop GUI functionality at the user interface 17 so that policy writers may express common policies without using text files.

(2) Policy Tracer

Figure 16A:
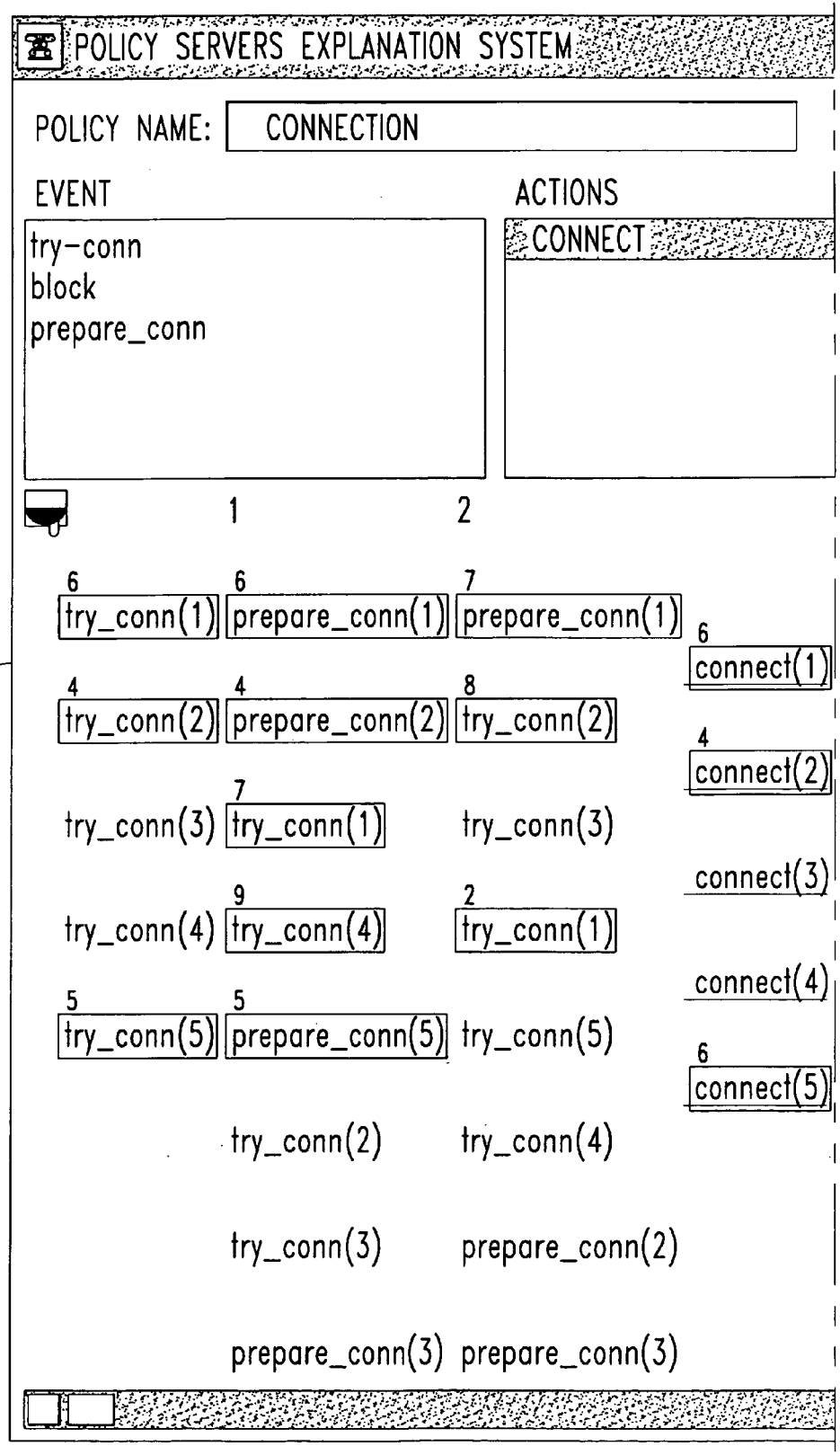
FIG. 16 is a diagrammatic illustration of a graphical user interface implementing a policy tracer for use by network administrators.
Figure 16B:
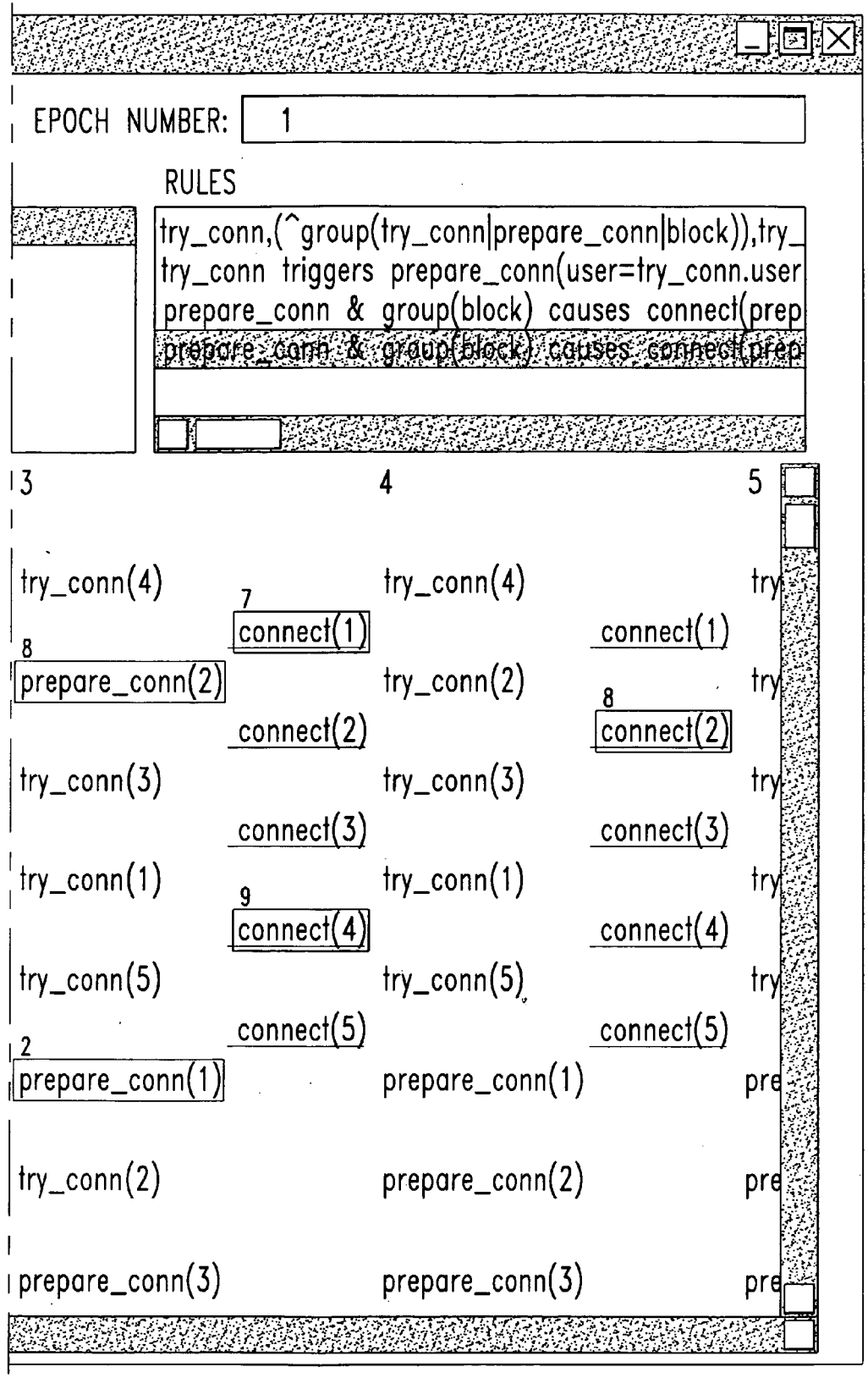

A policy tracer can be implemented that receives, as input, logs generated by the policy server 8 and the policy agents 8a showing events and actions. A GUI component of the user interface 17 is generated to let network administrators select actions or trigger events. The policy tracer the identifies the sources that caused the action or triggered the event. In this environment, network administrators can select multiple actions and events to see if there is any interaction between the actions or events. Histories can be initially compactly represented and the network administrator can, with the click of a mouse button, expand the history to see more granularity. FIG. 16 shows an exemplary GUI 270 and the selection of several actions by a user for tracing in the lower graphics section thereof. The actions are marked with the numbered boxes. The events that led to that action are also in a box with the same number. The columns represent the epochs. The upper text information section of the GUI 270 allows the user to specify the policy name, the starting epoch number, the policy events, the policy actions and the policy rules.

(3) Policy Debugging and Testing

Figure 17:
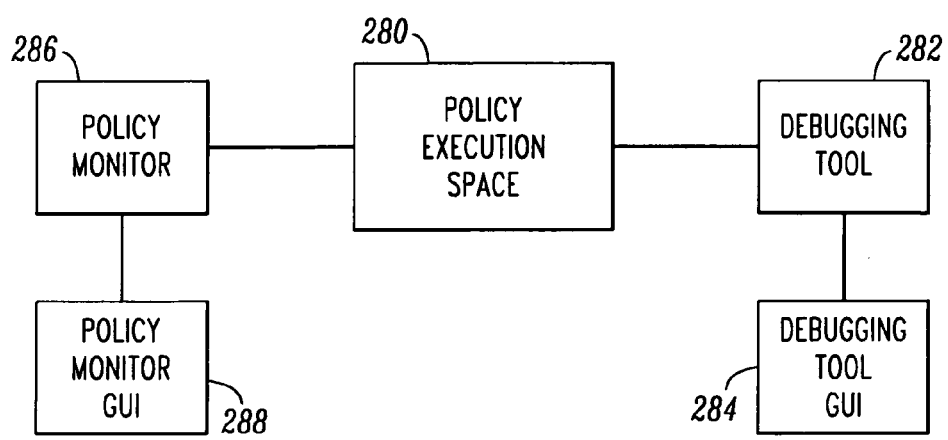
FIG. 17 is a functional block diagram showing a policy execution space in combination with a policy debugging tool and a policy monitor.

Turning now to FIG. 17, a policy execution space 280 is shown in combination with a debugging tool 282 that is configured to help users test and debug their policies. Through a GUI 284 function provided at the user interface 17, the debugging tool 282 allows users to ask hypothetical questions about a policy. Queries may be of the form: "Give me an event history that will trigger this action," or "Complete this event history until this action is triggered," or "Find an event history that triggers a given sequence of actions." Note that the debugging tool 282 could rely on a database of pre-written hypothetical scenarios, or a database representing a history of actual network management operations.

(4) Transactions and Work Flows

Actions are normally atomic, and are executed at a single PEP. However, in a more general case, an action may comprise a series of activities that execute around the network. It is therefore important to be able to implement actions wherever and whenever needed. Note that it will then also be important to handle partial failures while executing an action. An extension of the policy manager 2 can be made with a model to handle complex actions that will be specified as a workflow of simple sub-actions. The model may be based in a language that runs on top of PDL to write work flows. Work flows in this language will be compiled into policies and a policy processing point 42 can be used to handle the complex actions.

(5) Conflict Resolution in Policies

A conflict is said to occur when rules within a policy, or across policies, yield a set of actions marked as mutually exclusive by the network administrator. As shown in FIG. 17, a policy monitor 286 may be implemented to operate in conjunction with the policy execution space 280. A GUI 288 function is provided at the user interface 17 and is used for programming the policy monitor 286. A formal model can be developed for the policy monitor 286 so that it detects rule conflicts and finds resolutions to these conflicts. The model works as follows: Given a policy and a set of constraints on the concurrent execution of actions, the model produces actions to be taken by the policy monitor 286 relative to the policy. The policy monitor 286 can be programmed to filter the output of a policy (i.e. the set of actions) by canceling some actions to obtain a result consistent with the constraints. A important goal is to build unobtrusive monitors such that some observers of the output of a policy will have little or no knowledge of the effects the monitor has on the policy. In particular, if the observer has no access to the input of the policy, ideally he/she should be able to assume that the input stream never generated an inconsistent output. Other models can be developed to delay actions instead of canceling them, or to compose policies into new polices with no conflicts.

Accordingly, a novel policy management system is disclosed that implements a programmable policy-based network management approach. The syntax of a policy description language is further described and a few working examples are presented. It is also shown how policies can be applied to the various components of a software switch, thereby increasing the versatility of such a system by giving it the needed programmability.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A policy management system for managing network elements in a telecommunication network, comprising:
one or more policy proxies associated with said network elements; and
a central policy processing point in communication with said policy proxies;
wherein said policy proxies are configured to notify said policy processing point of events occurring in said network;
wherein said policy processing point is run-time programmable with one or more policies to process said events and to notify one or more of said policy proxies of actions to be taken in response to said events;
wherein said policies are based on a policy definition language that defines (1) primitive events representing a single network element event, (2) basic events representing a group of primitive events occurring within a single time epoch, (3) complex events representing an accumulation of primitive events over plural time epochs, (4) internal events generated in response to network elements failing to take required actions, and (5) policy defined events generated by said policies according to policy defined event rules
wherein said policy proxies are configured to implement said actions at network elements they represent; and
further including a failover and upgrade system wherein:
an external monitoring script functions to restart said policy processing point and said policy proxies should such components become non-operational;
said policy processing point and said policy proxies are configured to enter a retry mode if communication with another component cannot be established, and if said retry mode is unsuccessful to consult a directory server to refresh location information relative to said component;
said policy proxies are configured to raise internal alarms if they are disconnected from, or cannot reach, an associated network element for a period of time;
an aggregator or said policy proxies maintain state on event registrations performed at each policy proxy;
said policy processing point monitors connection status with said aggregator, and following a disconnection therefrom, reloads its policies upon a reconnect; and
said policy processing point stores its policies in said directory server.

2. A system in accordance with claim 1 wherein said events are associated with event contexts and said policies are defined to produce actions in response to said events based on policy defined rules.

3. A system in accordance with claim 1 wherein one or more of said policy proxies are respectively associated with only a single network element.

4. A system in accordance with claim 1 wherein said policy proxies include an event filter.

5. A system in accordance with claim 4 wherein said event filter is configured to perform one or more of processing events into a device independent format, aggregating primitive events into basic or complex events, and raising internal events that reflect non occurrence of expected events.

6. A system in accordance with claim 1 wherein said policy proxies are configured to store event registration information identifying policies that have registered for selected events.

7. A system in accordance with claim 1 wherein said policy processing point includes one or more of an event registration unit for registering events processed by said policy processing point with said policy proxies, an event distribution component for distributing event registration information to said policy proxies, an action/condition handler, and an action distribution component.

8. A system in accordance with claim 1 further including one or more distributed policy processing points associated with said policy proxies and adapted to process local events received from said policy proxies.

9. A system in accordance with claim 1 further including an aggregator for routing action commands from said policy processing point to said policy proxies.

10. A system in accordance with claim 9 wherein said policy proxies are identified in said policies using domain information, and said system includes a directory server that maintains a domain registry that associates said domain information with policy proxy addresses, said directory server being responsive to domain resolution queries from said aggregator.

11. A system in accordance with claim 1 wherein said policy proxies are identified in said policies using domain information, and said system includes a directory server that maintains a domain registry that associates said domain information with policy proxy addresses, said directory server being responsive to domain resolution queries from said policy processing point.

12. A system in accordance with claim 1 further including a failover and upgrade system wherein processes run by said policy processing point and said policy proxies are duplicated on separate hardware.

13. A system in accordance with claim 1 further including an administrative module implementing a graphical user interface for writing policies run by said policy processing point.

14. A system in accordance with claim 1 further including an administrative module implementing a graphical user interface for tracing policies run by said policy processing point, said interface being configured to allow users to select actions and trigger events involved in said policies, and to trace sources that cause said actions or trigger said events.

15. A system in accordance with claim 1 further including a debugging tool for testing and debugging policies, said debugging tool being responsive to questions about said policies under hypothetical circumstances by providing information about operational conditions of said system under said circumstances.

16. A system in accordance with claim 15 wherein said debugging tool is configured to respond to (1) queries requesting an event history that will trigger a specified action or sequence of actions, and (2) queries requesting completion of an event history until a specified action is triggered.

17. A system in accordance with claim 1 wherein said actions include complex actions performed according to a prescribed work flow of subactions.

18. A system in accordance with claim 1 further including a policy monitor configured to detect rule conflicts in said policies based on a specified set of constraints on concurrent execution of certain actions.

19. A policy management method for managing network elements in a telecommunication network, comprising the steps of:
   configuring a policy execution space at run time to run one or more policies;
   monitoring events occurring at said network elements;
   processing said events at a central policy processing point by applying said one or more policies;
   said processing including applying policy rules to said events to determine actions to be taken in response to said events;
   said policies being based on a policy definition language that defines (1) primitive events representing a single network element event, (2) basic events representing a group of primitive events occurring within a single time epoch, (3) complex events representing an accumulation of primitive events over plural time epochs, (4) internal events generated in response to network elements failing to take required actions, and (5) policy defined events generated by said policies according to policy defined event rules;
   controlling one or more of said network elements according to said actions; and
   further including failover and upgrade steps wherein:
   an external monitoring script functions to restart said policy processing point and said policy proxies should such components become non-operational;
   said policy processing point and said policy proxies are configured to enter a retry mode if communication with another component cannot be established, and if said retry mode is unsuccessful, to consult a directory server to refresh location information relative to said component;
   said policy proxies are configured to raise internal alarms if they are disconnected from or cannot reach, an associated network element for a period of time;
   an aggregator or said policy proxies maintain state on event registrations performed at
   said policy processing point monitors connection status with said aggregator, and following a disconnection therefrom, reloads its policies upon a reconnect; and
   said policy processing point stores its policies in said directory server.

20. A method in accordance with claim 19 wherein said events are associated with event contexts and said policies are programmed to produce actions in response to said events based on said policy rules.

21. A method in accordance with claim 19 further including one or more of aggregating primitive events into basic or complex events, generating internal events, registering events to associate with said policies, and filtering events prior to processing them at said policy processing point.

22. A method in accordance with claim 19 further including defining said network elements according to domain information in said policies and using domain resolution to determine which network elements to advise of said actions.

23. A method in accordance with claim 22 wherein said domain information is centrally stored in a domain registry.

24. A computer program product for policy management of network elements in a telecommunication network, comprising:
   a data storage medium;
   program means recorded on said data storage medium for configuring a policy execution space at runtime to run one or more policies;
   program means recorded on said data storage medium for monitoring events occurring at said network elements;
   program means recorded on said data storage medium for processing said events at a central policy processing point by applying said one or more policies, said processing including applying policy rules to said events to determine actions in response to said events;
   said policies being based on a policy definition language that defines (1) primitive events representing a single network element event, (2) basic events representing a group of primitive events occurring within a single time epoch, (3) complex events representing an accumulation of primitive events over plural time epochs, (4) internal events generated in response to network elements failing to take required actions, and (5) policy defined events generated by said policies according to policy defined event rules;
   program means recorded on said data storage medium for advising one or more of said network elements of said actions; and
   further including means recorded on said data storage medium for providing a failover and upgrade system wherein:

an external monitoring script functions to restart said policy processing point and said policy proxies should such components become non-operational;

said policy processing point and said policy proxies are configured to enter a retry mode if communication with another component cannot be established, and if said retry mode is unsuccessful, to consult a directory server to refresh location information relative to said component;

said policy proxies are configured to raise internal alarms if they are disconnected from or cannot reach, an associated network element for a period of time;

an aggregator or said policy proxies maintain state on event registrations performed at each policy proxy;

said policy processing point monitors connection status with said aggregator, and following a disconnection therefore reloads its policies upon a reconnect; and said policy processing point stores its policies in said directory server.

25. A product in accordance with claim 24 wherein said events are associated with event contexts and said policies are programmed to produce actions in response to said events based on said policy rules.

26. A product in accordance with claim 21 further including program means recorded on said data storage medium for aggregating primitive events into basic or complex events, generating internal events, performing one or more of registering events to associate them with said policies, and filtering events prior to processing them at said policy processing point.

27. A product in accordance with claim 24 further including program means recorded on said data storage medium for using domain resolution to identify policy proxies defined by way of domain information in said policies.

* * * * *